(12) United States Patent
Bickham et al.

(10) Patent No.: US 10,816,743 B2
(45) Date of Patent: Oct. 27, 2020

(54) HIGH-DENSITY OPTICAL FIBER RIBBON AND RIBBON CABLE INTERCONNECTS EMPLOYING SMALL DIAMETER OPTICAL FIBERS

(71) Applicant: CORNING INCORPORATED, Corning, NY (US)

(72) Inventors: Scott Robertson Bickham, Corning, NY (US); Ulrich Wilhelm Heinz Neukirch, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/434,231

(22) Filed: Jun. 7, 2019

(65) Prior Publication Data

US 2019/0384026 A1    Dec. 19, 2019

Related U.S. Application Data

(60) Provisional application No. 62/685,619, filed on Jun. 15, 2018.

(51) Int. Cl.
*G02B 6/44* (2006.01)
*G02B 6/42* (2006.01)

(52) U.S. Cl.
CPC ......... *G02B 6/4403* (2013.01); *G02B 6/4243* (2013.01); *G02B 6/4292* (2013.01)

(58) Field of Classification Search
None
See application file for complete search history.

(56) References Cited

U.S. PATENT DOCUMENTS

| | | | |
|---|---|---|---|
| 6,576,058 B2 * | 6/2003 | Oishi ................... | C03C 25/1065 118/125 |
| 6,601,998 B2 * | 8/2003 | Arsenault ................ | G02B 6/42 385/88 |
| 6,604,866 B1 * | 8/2003 | Kang ................... | G02B 6/3885 385/60 |

(Continued)

OTHER PUBLICATIONS

International Search Report and Written Opinion of the European International Searching Authority; PCT/US2019/035341; dated Sep. 11, 2019; 13 Pgs.

(Continued)

*Primary Examiner* — Rhonda S Peace
(74) *Attorney, Agent, or Firm* — Grant A. Gildehaus

(57) ABSTRACT

A high-density optical fiber cable interconnect includes a fiber ribbon or fiber ribbon cable having at least one fiber ribbon and first and second ends. The fiber ribbon is formed from small diameter optical fibers arranged in at least one row, with each fiber having a glass section and a non-glass coating section surrounding the glass section. The diameter of the non-glass coating section can be less than 205 microns. A matrix layer encapsulates the small diameter optical fibers to define the fiber ribbon. A first optical connector terminates the first end of the fiber ribbon or fiber ribbon cable and has a first fiber pitch correspond to a standard optical fiber connector. A second optical connector terminates the second end of the fiber ribbon or fiber ribbon cable and has a second fiber pitch less than that of a standard optical fiber connector.

33 Claims, 20 Drawing Sheets

(56) References Cited

U.S. PATENT DOCUMENTS

| | | | |
|---|---|---|---|
| 6,913,397 B2* | 7/2005 | Kang | G02B 6/3672 29/564.2 |
| 7,108,431 B2* | 9/2006 | Yang | G02B 6/3833 385/114 |
| 7,186,031 B2* | 3/2007 | Yang | G02B 6/381 385/53 |
| 7,366,386 B2 | 4/2008 | Sako et al. | |
| 7,527,434 B2* | 5/2009 | Naka | B29C 45/0013 385/72 |
| 7,587,108 B2* | 9/2009 | Carpenter | G02B 6/30 385/137 |
| 7,620,282 B2 | 11/2009 | Bickham et al. | |
| 7,773,848 B2 | 8/2010 | Bookbinder et al. | |
| 7,787,732 B2 | 8/2010 | Sugizaki et al. | |
| 7,805,039 B2 | 9/2010 | Sanders et al. | |
| 9,389,382 B2* | 7/2016 | Blazer | G02B 6/4405 |
| 9,568,691 B2* | 2/2017 | Hurley | G02B 6/4246 |
| 9,715,071 B1* | 7/2017 | Kim | G02B 6/30 |
| 2002/0081084 A1* | 6/2002 | Matsumoto | G02B 6/3885 385/120 |
| 2003/0156814 A1* | 8/2003 | Yoon | G02B 6/3636 385/137 |
| 2004/0109646 A1* | 6/2004 | Anderson | G02B 6/3885 385/71 |
| 2008/0226241 A1 | 9/2008 | Sugizaki et al. | |
| 2008/0310805 A1 | 12/2008 | Sugizaki et al. | |
| 2009/0060432 A1* | 3/2009 | Sako | G02B 6/14 385/114 |
| 2011/0064368 A1 | 3/2011 | Bookbinder et al. | |
| 2015/0043871 A1* | 2/2015 | Mitose | G02B 6/3885 385/76 |
| 2016/0266343 A1 | 9/2016 | Weimann et al. | |
| 2016/0291261 A1* | 10/2016 | Izumi | G02B 6/3839 |
| 2019/0384026 A1* | 12/2019 | Bickham | G02B 6/4243 |

OTHER PUBLICATIONS

Bennet et al; "Small Diameter Low Attenuation Optical Fiber"; Filed as U.S. Appl. No. 16/391,859, filed Apr. 23, 2019; 66 Pages.

Isaji et al; "Multi-Mode Fiber Ribbon Compatible With Standard Ribbon for High-Density Optical Interconnection", 56th IWCS 2007, Paper 5-2; pp. 149-153.

Ishikawa et al; "High-Density and Low-Cost 10-Gbps×12ch Optical Modules for High-End Optical Interconnect Applications", OFC/NFOEC2008, Paper OMK6; 3 Pages.

Iwaya et al; "Development of Optical Wiring Technology for Optical Interconnects," Furukawa Review vol. 41, pp. 1-5 (2012).

Sabano et al; "Development of a Multiple-Row MT Connector for 80 m Diameter Optical Fibers," Proc. OFC 2009; 3 Pages.

* cited by examiner

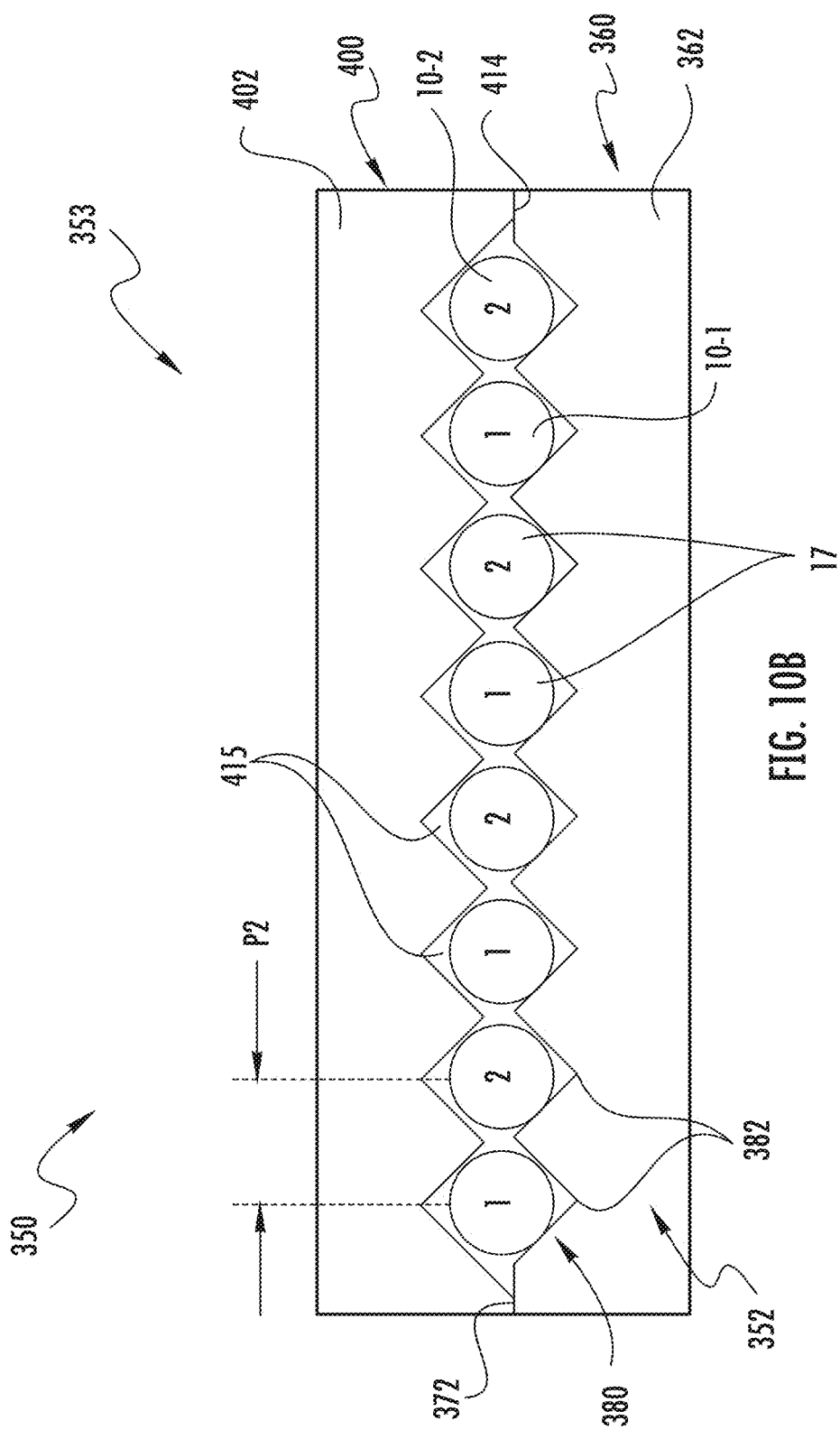

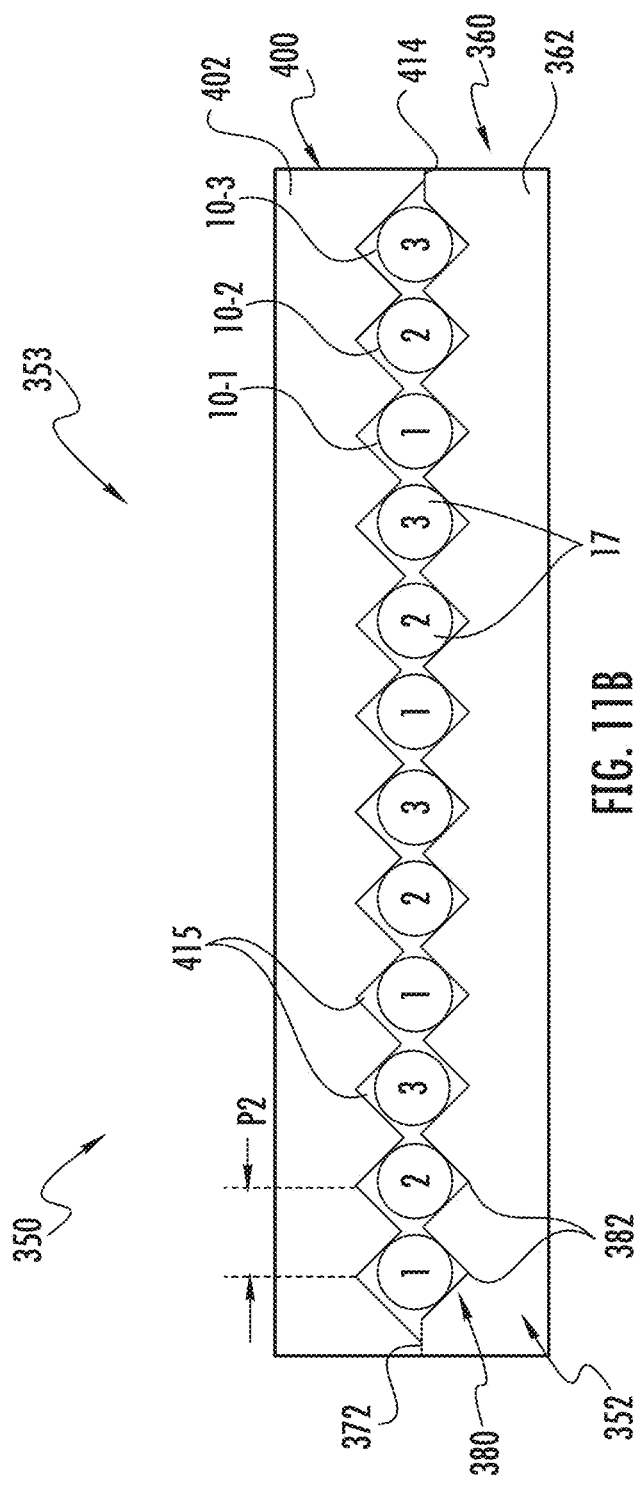

HIGH-DENSITY OPTICAL FIBER RIBBON AND RIBBON CABLE INTERCONNECTS EMPLOYING SMALL DIAMETER OPTICAL FIBERS

PRIORITY APPLICATION

This application claims the benefit of priority of U.S. Provisional Application No. 62/685,619, filed on Jun. 15, 2018, the content of which is relied upon and incorporated herein by reference in its entirety.

FIELD

The present disclosure relates to optical fiber cable interconnects, and in particular to high-density optical fiber ribbons employing small diameter optical fibers and high-density optical fiber ribbon cable interconnects that employ the high-density optical fiber ribbon.

BACKGROUND

The push for higher data rates in digital communications has driven the integration of optics with electronics. In particular, the use of silicon photonics for electro-optical transceivers has resulted in very dense optical circuitry concentrating many separate optical signal lines into one photonic chip. For optical signal transmission over large distances, the optical signals need to be coupled into optical fibers.

The standard geometry for optical fibers is a glass diameter of 125 micrometers and a coating diameter of 250 micrometers. This standard geometry is well-suited for connections between optical fiber cables and between an optical fiber cable and relatively large telecommunication devices. On the other hand, the standard geometry is relatively large for chip-scale interconnections and severely restricts the maximum density of optical input and output connections for photonic chips. This problem is exacerbated by the fact that standard optical fibers cannot be bent into very tight radii without incurring high macrobend losses.

SUMMARY

An embodiment of the disclosure is a high-density fiber ribbon, comprising: a) a plurality of small diameter optical fibers arranged in one or more rows, wherein each small diameter optical fiber comprises: i) a glass section with a diameter d4; ii) non-glass coating section that surrounds the glass section and having a diameter dC and that defines an outer surface; iii) a mode-field diameter at a wavelength of 1310 nm of between 8.6 and 9.5 microns; iv) a fiber cutoff wavelength less than 1260 nm; and v) a bend loss for a single turn of the small diameter fiber around a mandrel with a 15 mm diameter of less than 0.1 dB at a wavelength of 1550 nm; b) a matrix layer that encapsulates the plurality of small diameter optical fibers; and c) an attenuation per each of the small diameter optical fibers as encapsulated in the matrix layer of less than 0.5 dB/km at a wavelength of 1310 nm and less than about 0.4 dB/km at a wavelength of 1550 nm.

Another embodiment of the disclosure is a high-density ribbon cable, comprising: a) at least one fiber ribbon comprising plurality of small diameter optical fibers, wherein each small diameter optical fiber comprises: i) a glass section with a diameter d4; ii) non-glass coating section that surrounds the glass section and having a diameter dC and defining an outer surface; iii) a mode-field diameter at a wavelength of 1310 nm of between 8.6 and 9.5 microns; iv) a fiber cutoff wavelength less than 1260 nm; and v) a bend loss for a single turn of the small diameter fiber around a mandrel with a 15 mm diameter of less than 0.1 dB at a wavelength of 1550 nm; b) a matrix layer that encapsulates the small diameter optical fibers; and c) an attenuation per each of the small diameter optical fibers as encapsulated in the matrix layer of less than 0.5 dB/km at a wavelength of 1310 nm and less than about 0.4 dB/km at a wavelength of 1550 nm.

Another aspect of the disclosure is a high-density ribbon cable interconnect, comprising: a ribbon cable comprising a first end, a second end, and at least one fiber ribbon comprising plurality of small diameter optical fibers having a glass section of diameter d4 and a non-glass coating section surrounding the glass section and having a diameter dC and defining an outer surface, wherein the diameter dC<205 microns, the fiber ribbon further comprising a matrix layer that encapsulates the plurality of small diameter fibers; a first optical connector operably arranged at the first end and having a first fiber pitch P1 about 125 microns; and a second optical connector operably arranged at the second end and having a second fiber pitch P2<about 100 microns.

Another aspect of the disclosure is an optical data transmission system that includes either the fiber ribbon or fiber ribbon cable disclosed herein and terminated by first and second optical connectors. The optical data transmission system includes a photonic device having a photonic chip that supports optical waveguides and is configured to operably engage the second optical connector. The optical data transmission system also includes a telecommunications device configured to operably engage the first optical connector. The telecommunications device can be a telecommunications apparatus (e.g., a server) or an optical fiber cable. In an example, the first optical connector has a standard pitch while the second optical fiber has a high-density pitch that substantially matches the pitch of the optical waveguides of the photonic chip.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which:

FIG. 10B is an end-on view of the example high-density interconnect showing the interleaved SD fibers and also showing an example where the cover plate includes grooves.

FIG. 11B is similar to FIG. 10B and shows the interleaved SD fibers of FIG. 11A.

DETAILED DESCRIPTION

Figure 1:
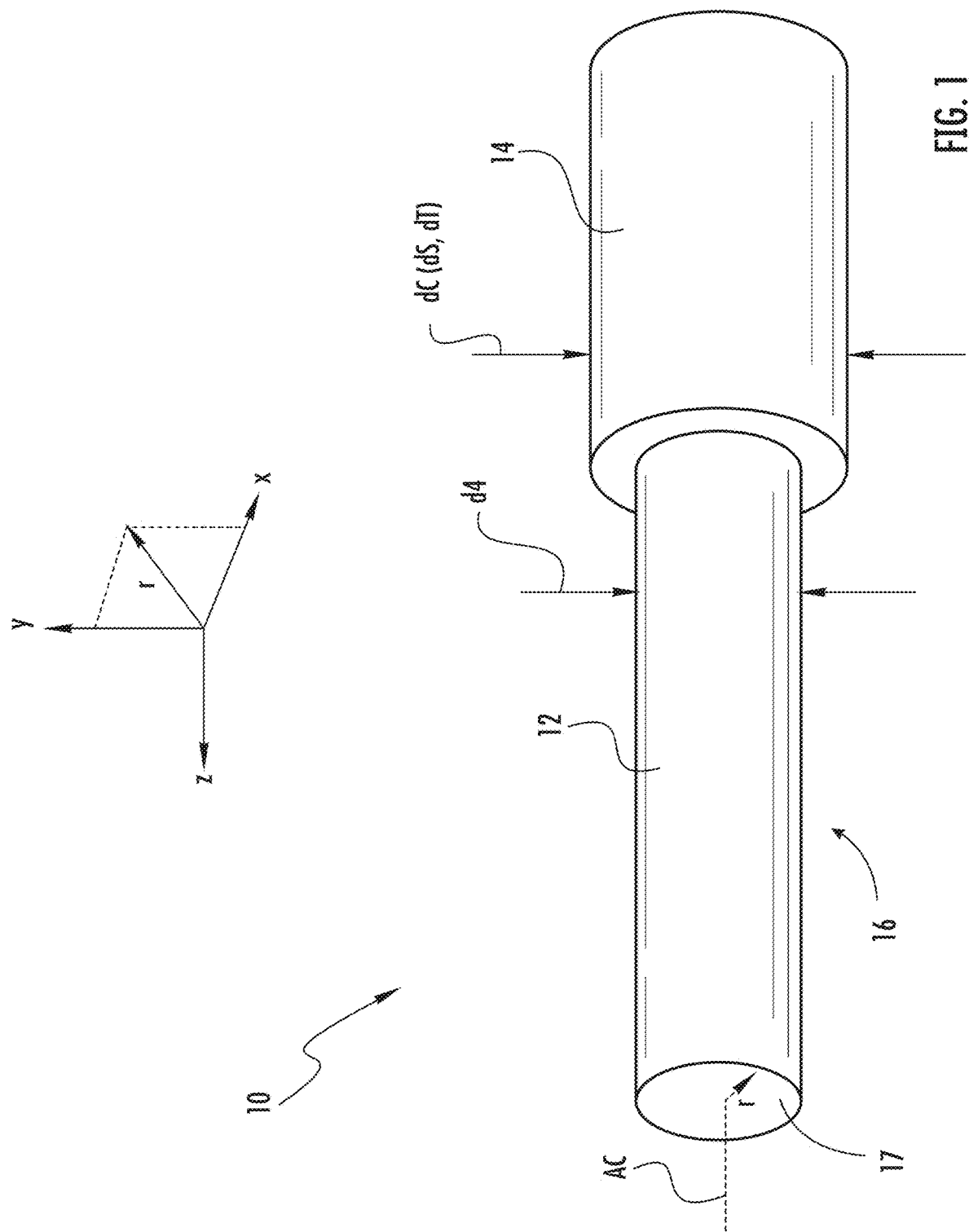
FIG. 1 is a schematic elevated view of an example small diameter optical fiber ("SD fiber") showing an exposed glass end section and a non-glass protective coating section surrounding the remaining portion of the glass section.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

Likewise, relative terms like top, bottom, side, horizontal, vertical, etc. are used for convenience and ease of explanation and are not intended to be limiting as to direction or orientation.

The abbreviation "nm" stands for nanometer.

The abbreviation "µm" stands for micron or micrometer.

The "relative refractive index" as used herein is defined as:

$$\Delta \% = 100 \frac{n^2(r) - n_{cl}^2}{2n^2(r)}$$

where n(r) is the refractive index of the fiber at the radial distance r from the fiber's centerline, unless otherwise specified, and $n_{cl}$ is the index of the outer cladding. When the outer cladding is essentially pure silica, $n_{cl}$=1.444 at a wavelength of 1550 nm. As used herein, the relative refractive index percent (also referred herein as the relative refractive index) is represented by Δ (or "delta"), Δ% (or "delta %"), or %, all of which are used interchangeably herein, and its values are given in units of percent or %, unless otherwise specified. Relative refractive index may also be expressed as Δ(r) or Δ(r)%.

The expression "A/B microns" such as "125/250 microns" or "80/165 microns" is shorthand notation to describe the configuration of an optical fiber, where A is the diameter of the glass section (core and cladding) of the optical fiber in microns and B is the diameter of the coated optical fiber (i.e., core and cladding and protective coatings) in microns.

The acronym "ABR" stands for "aggregated bit rate."

The acronym "MPO" stands for "multifiber push on" and refers to a type of optical fiber connector.

The term "fiber density" means the number of optical fibers per unit length for optical fibers arranged in a single row or the number of fibers per unit area for optical fibers arranged in more than one row. Likewise, the term "waveguide density" means the number of optical waveguides per unit length for optical waveguides arranged in a single row or the number of optical waveguides per unit area for optical waveguides arranged in more than one row.

The term "high density" when applied to optical fibers or optical waveguides means a greater number of optical fibers or optical waveguides per unit length or unit area as compared to configurations of conventional 125/250 micron optical fibers or optical waveguides.

The macrobend performance of the small diameter fibers can be gauged by measuring the induced attenuation increase in a mandrel wrap test. In the mandrel wrap test, the small diameter fiber is wrapped one or more times around a cylindrical mandrel having a specified diameter (e.g., 10 mm, or 15 mm, etc.), and the increase in attenuation at a specified wavelength due to the bending is determined. Attenuation in the mandrel wrap test is expressed in units of dB/turn, where one turn refers to one revolution of the small diameter fiber about the mandrel.

The cutoff wavelength $\lambda_C$ is the minimum wavelength where an optical fiber will support only one propagating mode. If the optical fiber is used at a wavelength that is below (i.e., smaller than) the cutoff wavelength, multimode operation may take place and the introduction of an additional source of dispersion may limit the fiber's information carrying capacity. The fiber and cabled fiber cutoff wavelengths can be measured according to the procedures defined in FOTP-80 IEC-60793-1-44 Optical Fibres—Part 1-44: Measurement Methods and Test Procedures—Cut-Off Wavelength. All methods require a reference measurement, which in the case of bend-insensitive SD fibers, should be the multimode-reference technique rather than the bend-reference technique.

The various values for fiber-related parameter discussed herein such as fiber pitch, waveguide pitch, etc., are provided as nominal values and it will be understood that deviations from the nominal values provided based on normal manufacturing tolerances and fabrication shortcomings can result in slight variations from the stated nominal values, e.g., to within 1% or 2%, depending on the particular application.

Small Diameter Optical Fibers

The high-density optical fiber cable interconnects disclosed herein employ small diameter optical fibers ("SD fibers") of the type disclosed in U.S. Provisional Patent Application No. 62/664,359, entitled "Small diameter low attenuation optical fiber," filed on Apr. 30, 2018, and which is incorporated by reference herein.

The SD fibers employed herein have excellent microbending and macrobending performance and a mode field diameter that may permit splicing and connecting to G.657 single-mode fibers (e.g. Corning® SMF-28e+® fibers and Corning® SMF-28® Ultra fibers) with minimal losses. The SD fibers can overcome trade-offs in the mode field diameter (MFD), attenuation and/or bending losses that have accompanied previous efforts to manufacture reduced diameter optical fibers. The SD fibers can be utilized in the high-density ribbon cables and ribbon cable interconnects as discussed below for internal installations and yet provide good matching and low losses when integrated with conventional 125/250 micron single-mode fibers. The SD fibers have refractive index profiles that result in good fiber microbend and macrobend performance even when the thicknesses of the coating layers are small.

The SD fibers employed herein have low fiber cutoff wavelengths, which is required for them to provide single-mode operation at 1310 nm. The fiber cutoff wavelength is less than 1310 nm, and in some embodiments, is less than or equal to 1280 nm. The SD fibers also have low cabled-fiber cutoff wavelengths, which are less than or equal to the fiber cutoff wavelengths and also less than or equal to 1260 nm, which ensures compliance with the G.657.A1 and G.657.A2 standards.

The example SD fibers employed herein include a core, a cladding, a primary coating, a secondary coating, and an optional tertiary coating, where the cladding may include two or more regions with differing refractive index profiles, wherein the overall size (diameter) of the fiber is reduced as compared to a conventional optical fiber, and wherein the bend loss is less than that of a conventional optical fiber.

In an example, the SD fibers meet the G.657.A2 international fiber specification, and also in an example meet the G.657.B2 international fiber specification.

FIG. 1 is a schematic elevated view of an example SD fiber 10 showing an exposed glass section 12 with a diameter d4 and a non-glass protective coating section 14 with a diameter dC surrounding the glass section. The SD fiber 10 has a centerline AC that runs in the z-direction. A radial polar coordinate r extends perpendicular to the z-axis. The SD fiber 10 is assumed to be circularly symmetric about the z-axis (and thus the centerline AC) so that the angular polar coordinate is not needed.

Figure 2:
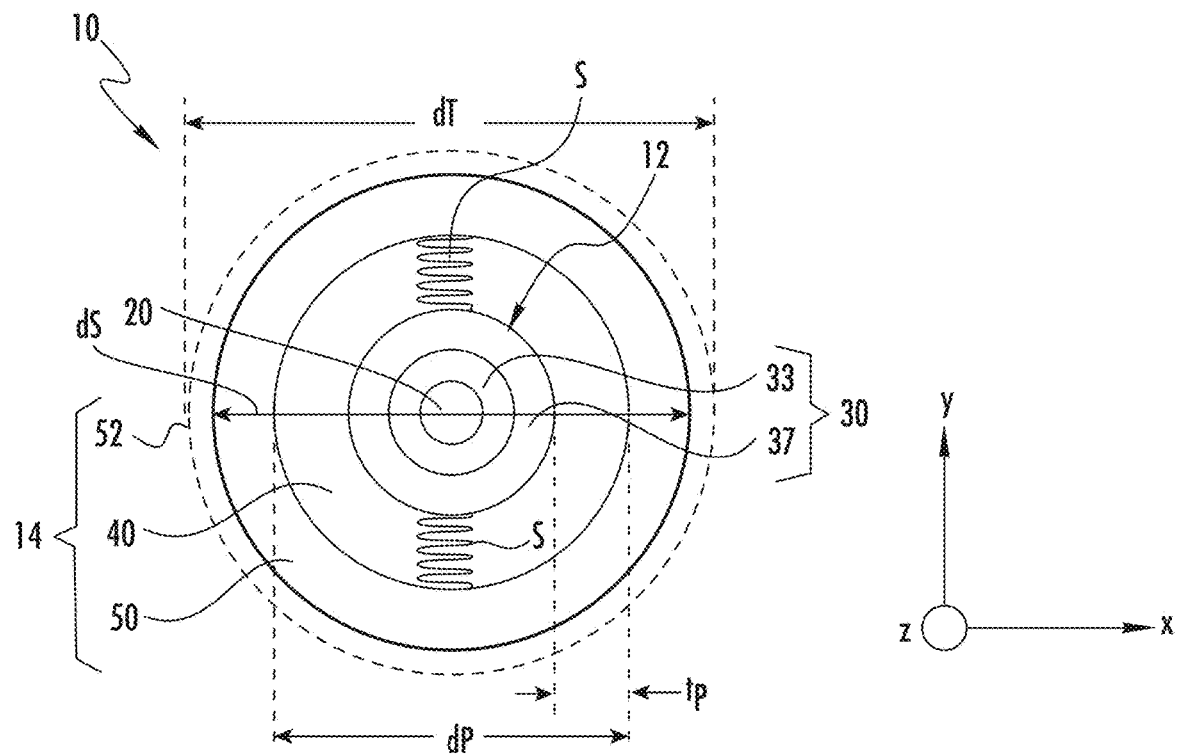
FIG. 2 is a schematic depiction in x-y cross-section of the glass section of an example SD fiber, wherein the glass section has a core, an inner cladding region, an outer cladding region, a primary coating, a secondary coating and an optional tertiary coating.
Figure 3:
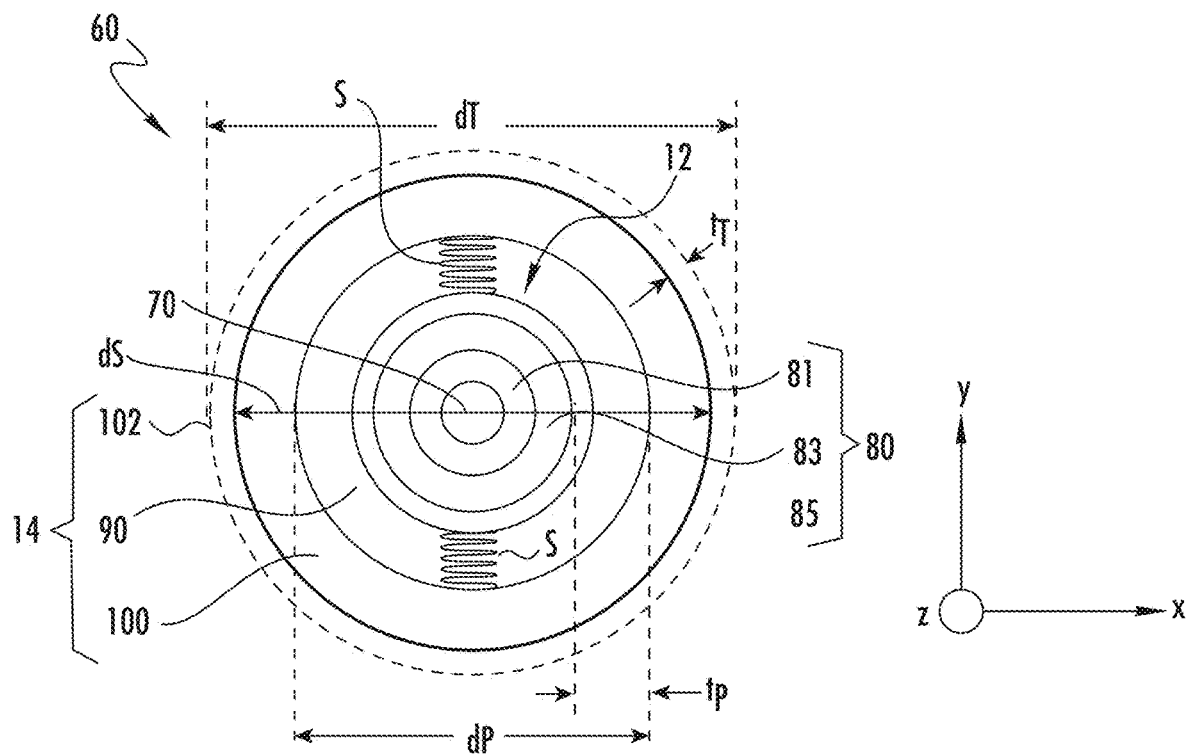
FIG. 3 is similar to FIG. 2 and shows an example configuration of the glass section as having two inner cladding regions, an outer cladding region, a primary coating, a secondary coating, and an optional tertiary coating.

FIGS. 2 and 3 are schematic x-y cross-sectional diagrams of example configurations of the glass section 12 of the SD fiber 10 of FIG. 1 as employed herein. The example SD fiber 10 of FIG. 2 includes a core 20, a cladding 30, a primary coating 40 of diameter dP and a radial thickness $t_P$, a secondary coating 50 of diameter dS and a radial thickness $t_S$ and an optional tertiary coating 52 of thickness $t_T$. The cladding 30 includes inner cladding region 33 and outer cladding region 37. The core 20 and cladding 30 constitute the glass section 12 while the primary coating 40, secondary coating 50 and optional tertiary coating 52 constitute the coating section 14.

The example SD fiber 10 of FIG. 3 includes a core 70, a cladding 80, a primary coating 90 of radial thickness $t_P$, a secondary coating 100 of thickness $t_S$, and an optional tertiary coating 102 of thickness $t_T$. The cladding 80 includes a first inner cladding region 81, a second inner cladding region 83, and an outer cladding region 85. The cladding 70 constitute the glass section 12 while the primary, secondary and optional tertiary coatings 90, 100 and 102 constitute the coating section 14. The primary coating 90 has a diameter dP, the secondary coating 50 or 100 has a diameter dS, and the tertiary coating 52 or 102 has a diameter dT.

With reference again also to FIG. 1, in one example, the diameter dC of the coating section 14 is defined by the diameter dS when the secondary coating 50 or 100 is the outermost coating, and in another example by the diameter dT when the tertiary coating 52 or 102 is the outermost coating.

Figure 4A:
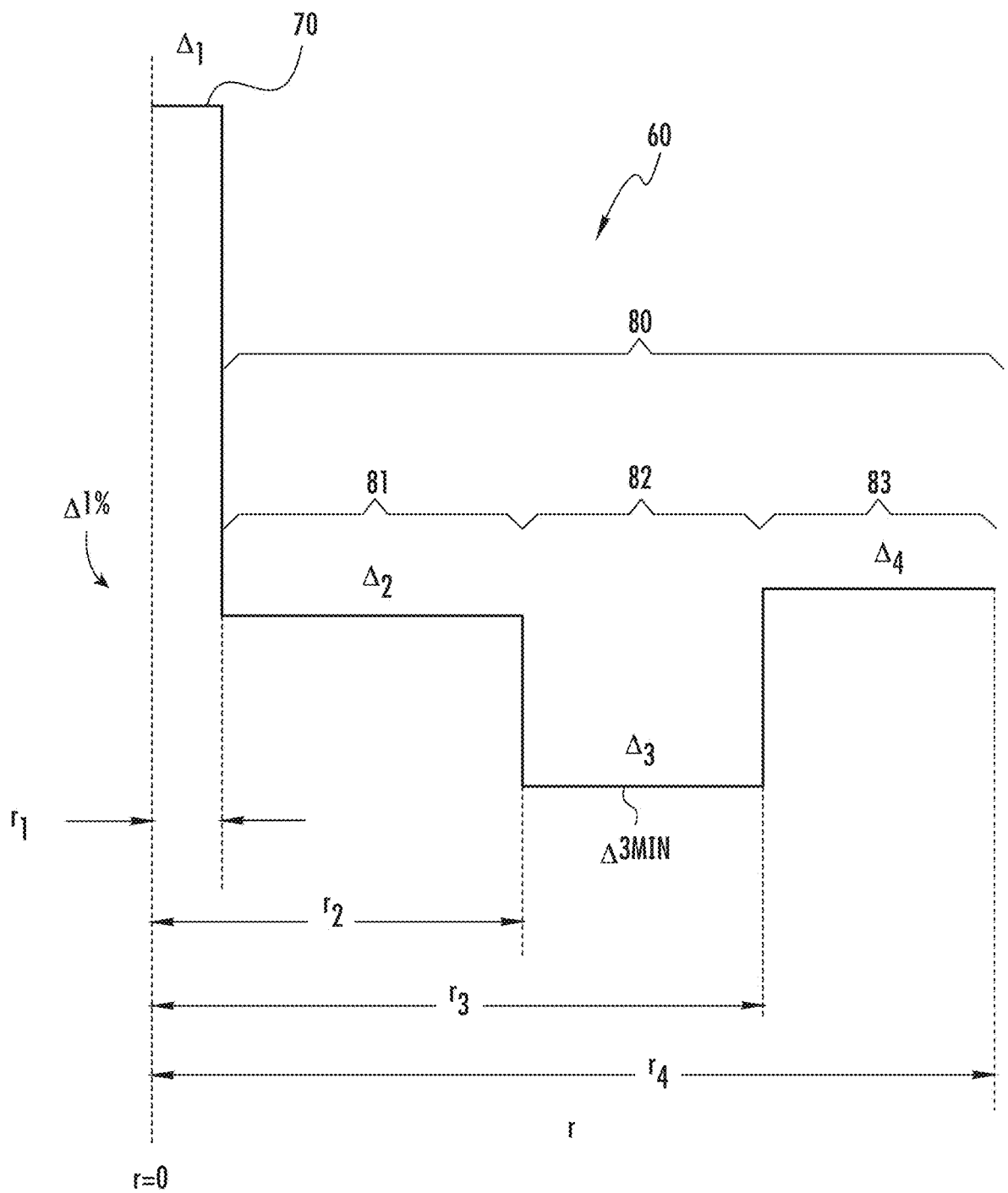
FIG. 4A is a schematic depiction of an illustrative plot of the core-cladding relative refractive index profile for the SD fiber configuration of FIG. 3.
Figure 4B:
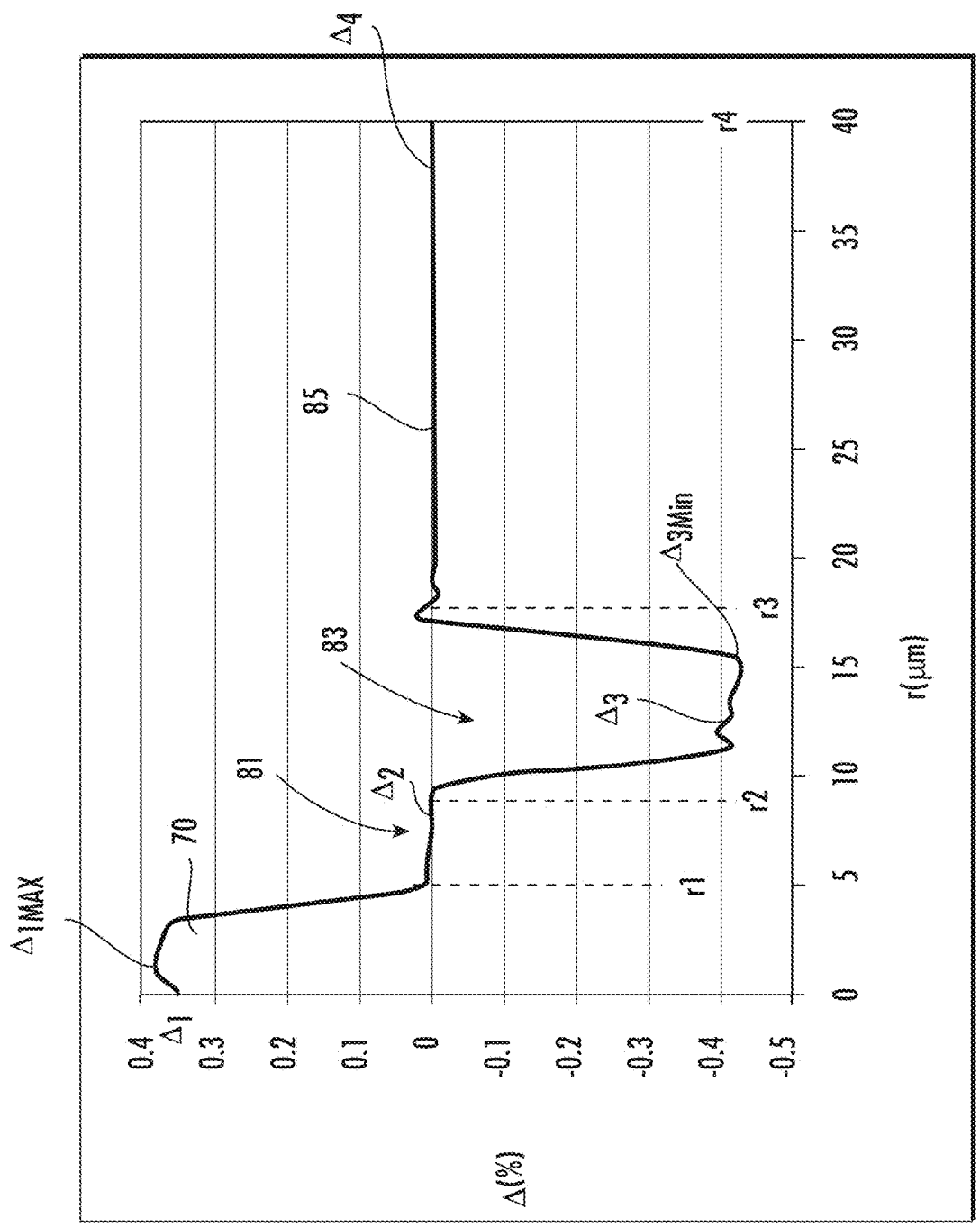
FIG. 4B is similar to FIG. 4A is a relative refractive index plot based on measurements of an example SD fiber having the basic refractive index profile for the SD fiber configuration of FIG. 3.

FIGS. 4A and 4B are plots of the relative refractive index Δ% (relative to pure silica glass) versus the radius r (μm or microns) for the example SD fiber 10 of FIG. 3. FIG. 4A shows the core 70 with an outer radius $r_1$ and relative refractive index $\Delta_1$. The cladding 80 has the first inner cladding region 81 extending from the radial position $r_1$ to a radial position $r_2$ and having relative refractive index $\Delta_2$, the second inner cladding region 83 extending from the radial position $r_2$ to a radial position $r_3$ and having relative refractive index $\Delta_3$, and the outer cladding region 85 extending from the radial position $r_3$ to a radial position $r_4$ and having relative refractive index $\Delta_4$.

In the example profile of FIG. 4A, the second inner cladding region 83 may be referred to herein as a rectangular trench and may have a constant relative refractive index that is less than the relative refractive indices of the first inner cladding region 81 and the outer cladding region 85. The rectangular trench 83 shown in FIG. 4A, for example, may be established by incorporating Fluorine as a downdopant, to provide a relative refractive index $\Delta_{3MIN}$. The core 70 may have the highest relative refractive index ($\Delta_1$) in the profile. The core 70 may include a lower relative refractive index region at or near the centerline (known in the art as a "centerline dip"). The core relative refractive index profile may be or may approximate a Gaussian profile, may be an α profile, may be a step index profile, or may be a rounded step index profile. The SD fiber 10 of FIG. 4A includes the primary coating 90 and a secondary coating 100, but only the glass section 12 of the SD fiber is shown in the profile.

FIG. 4B is similar to FIG. 4A and shows an example measured relative refractive index profile, also expressed in Δ% relative to pure silica glass. The small oscillations in the plot are due to measurement noise. With reference to FIGS. 4A and 4B, the example SD fiber 10 has the following configuration: the core 70 has an outer radius $r_1$ and a relative refractive index $\Delta_1$, and the cladding 80 has a first inner cladding region 81 extending from the radial position $r_1$ to the radial position $r_2$ and having a relative refractive index $\Delta_2$, a second inner cladding region 83 extending from the radial position $r_2$ to the radial position $r_3$ and having a relative refractive index $\Delta_3$, and an outer cladding region 85 extending from the radial position $r_3$ to the radial position $r_4$ and having relative refractive index $\Delta_4$.

In the profile of FIG. 4B, the rectangular trench 83 may have a constant relative refractive index that is less than the relative refractive indices of the first inner cladding region 81 and the outer cladding region 85. The example rectangular trench shown may be established by incorporating Fluorine as a downdopant, to provide a minimum relative refractive index $\Delta_{3MIN}$. In the example of FIG. 4B, the rectangular trench has a bottom slope with the minimum relative refractive index $\Delta_{3MIN}$ occurring at radius $r_3$. In the embodiment of FIG. 4B, the core 70 has have highest relative refractive index ($\Delta_1=\Delta_{1MAX}$) in the core-cladding profile, with a slight dip in the profile at r=0. The SD fiber 10 of FIG. 4B includes the primary coating 90 and a secondary coating 100, but only the glass section 12 of the SD fiber is shown in the profile.

The relative refractive index profiles for the configuration of SD fiber 10 of FIG. 2 have a simpler form as those for FIG. 3, with the cladding 30 of the FIG. 2 configuration having one fewer region than the cladding 80 of the FIG. 3 configuration.

The core 20 or 70 and the cladding 30 or 80 may comprise silica or silica-based glass and may optionally include an updopant or a downdopant. The silica-based glass may be silica glass modified by an alkali or alkaline earth element, one or more halogens, or other dopants. The radius $r_1$ of the core 20 or 70 may be in the range of 3.6 to 5.4 microns, for example 4 to 5 microns or 4.2 to 4.8 microns. The refractive index across the core 20 or 70 may be constant or variable. The refractive index of the core 20 or 70 may be at a maximum at or near the center of the core and may continuously decrease in the direction of the outer core boundary. The refractive index profile of the core 20 or 70 may be or may approximate a Gaussian profile, an α-profile, a step profile or a rounded step index profile with an alpha value in the range between 6 and 12. The maximum or peak refractive index delta of the core $\Delta_{1MAX}$ may be in the range from 0.32% to 0.42%, or from 0.34% to 0.40%, or from 0.35% to 0.39%.

The core 20 or 70 may be characterized by a core profile volume, $V_1$, in units of %-microns$^2$, equal to:

$$V_1 = 2\int_0^{r_1} \Delta(r) r \, dr$$

The magnitude $|V_1|$ of the core volume may be at least 5.8%-microns$^2$, or at least 6.0%-microns$^2$, or at least 6.2%-microns$^2$. The magnitude $|V_1|$ of the core volume may also be less than 6.8%-microns$^2$, or less than 6.6%-microns$^2$, or between 5.8%-microns$^2$ and 6.8%-microns$^2$, or between 6.0%-microns$^2$ and 6.6%-microns$^2$.

The glass cladding 30 or 80 may include the aforementioned two or more regions, which differ in refractive index profile and that may extend to an outer radius $r_4$ of not greater than 45 microns, or not greater than 42 microns, or not greater than 40 microns, or not greater than 35 microns, or not greater than 32.5 microns, or not greater than 30 microns. According to some embodiments the outer radius $r_4$ of the glass cladding 30 or 80 is between 25 microns and 45 microns, or between 30 microns and 42 microns, or between 35 microns and 42 microns, or between 38 microns and 42 microns, or between 25 microns and 35 microns. According to some embodiments, at least one region of the glass cladding 30, 80 is down-doped relative to silica (for example, by Fluorine or Boron).

The cladding 30 or 80 may include at least one inner cladding region surrounded by an outer cladding region, where the inner cladding region may have a lower refractive index than the outer cladding region. For example, the SD fiber 10 of FIG. 2 has an inner cladding region 33 and an outer cladding 37 while the SD fiber of FIG. 3 has two (first and second) inner cladding regions 81 and 83 and an outer cladding region 85. The refractive index of the inner cladding region may be constant or continuously varying. The refractive index of the inner cladding region may form a trench in the refractive index profile of the coated fiber. The trench is a depressed index region and may be approximately rectangular or triangular. The outer cladding region may have a constant or continuously varying refractive index. The minimum refractive index of the inner core region may be less than the maximum refractive index of the outer cladding region.

The refractive index of the second inner cladding region 83 may be lower than the refractive index of the first inner cladding region 81. The minimum refractive index of the second inner cladding region 83 may be lower than the maximum refractive index of the first inner cladding region 81. The refractive index of the second inner cladding region 83 may be lower than the refractive index of the outer cladding region 85. The minimum refractive index of the second inner cladding region 83 may be lower than the maximum refractive index of the outer cladding region 85. The refractive index of the second inner cladding region 83 may be lower than the refractive indices of the first inner cladding region 81 and the outer cladding region 85. The minimum refractive index of the second inner cladding region 83 may be lower than the maximum refractive indices of the first inner cladding region 81 and the outer cladding region 85.

The refractive index of the second inner cladding region 83 may be constant or varying (e.g., continually varying). The refractive index of the second inner cladding region 83 may form the aforementioned rectangular trench ("trench") in the refractive index profile. The trench is a depressed index region and may be rectangular or triangular, and can include a bottom with a non-uniform relative refractive index such as shown in FIG. 4B. The minimum relative refractive index delta $\Delta_{3MIN}$ of the trench may be less than −0.2%, less than −0.25%, less than −0.3% or less than −0.35%. The minimum relative refractive index delta $\Delta_{3MIN}$ of the trench $\Delta_3$ may be greater than −0.6%, greater than −0.55%, greater than −0.5%, greater than −0.45%, or between −0.2% and −0.6%, or between −0.25% and −0.55%, or between −0.3% and −0.5%. The inside radius $r_2$ of the trench may be greater than 9.0 microns, or greater than 9.4 microns, or greater than 9.8 microns. The inside radius $r_2$ of the trench may be less than 11.2 microns, or less than 10.8 microns, or less than 10.4 microns, or between 9.0 and 11.2 micron, or between 9.4 and 10.8 microns. The outside radius $r_3$ of the trench may be greater than 14.0 microns, or greater than 14.5 microns, or greater than 15.0 microns. The outside radius $r_3$ of the trench may be less than 18.0 microns, or less than 17.5 microns, or less than 17.0 microns, or between 14.0 and 18.0 micron, or between 15.0 and 17.0 microns.

The depressed index region may be characterized by a profile trench volume, $V_3$, in units of %-microns², equal to:

$$V_3 = 2\int_{r2}^{r3} \Delta(r) r dr$$

The magnitude $|V_3|$ of the trench volume may be at least 40%-microns², or at least 45%-microns², or at least 50%-microns². The magnitude $|V_3|$ of the trench volume may also be less than 75%-microns², or less than 70%-microns², or between 40%-microns² and 70%-microns².

The primary coating 40 or 90 of the SD fiber 10 is structured to act as a spring (shown schematically as a spring S in FIGS. 2 and 3) that couples the glass section 12 (i.e., cladding 30 or 80) of the SD fiber to the secondary coating 50 or 100.

Commercially-available optical fibers with small outer cladding diameters and small coated fiber diameters suffer from microbending losses unless the mode field diameter is reduced or the cutoff wavelength is increased. Improving microbending losses for such fibers has been difficult if the total thickness of the primary and secondary coatings has a smaller value than the 55-65 micron value in standard telecommunication fibers.

Decreasing the elastic modulus $E_P$ and thickness $t_P$ of the primary coating 40 or 90 can help reduce the microbending sensitivity of the SD fiber 10, but the thickness $t_P$ of the primary coating can only be increased if there is a concomitant decrease in the thickness $t_S$ of secondary coating 50 or 100 given that the total thickness $t_P+t_S$ of the two coating layers is constrained. Decreasing the secondary coating thickness $t_S$ is undesirable because it reduces puncture resistance of the coated SD fiber 10. However, the SD fibers 10 with their relatively small outer coating diameters dC≤170 microns, and relatively small outer cladding diameter (d≤90 microns) can have surprisingly good microbending and good resistance to puncture if the thicknesses $t_P$ and $t_S$ of the primary and secondary coatings are each at least about 10 microns. In some embodiments, the relative coating thickness, $t_P/t_S$, is in the range 0.5≤$t_P/t_S$≤1.5.

More specifically, the primary coating 40 or 90 can have an in situ elastic modulus $E_P$ of 0.35 MPa or less and a minimum thickness of $t_P$ of 10 microns (e.g., a thickness of 12.5 microns, 15 microns, 17.5 microns, or 20 microns), and in these embodiments the primary coating 30 or 90 acts as the aforementioned spring S that couples the stiff glass cladding (e.g., cladding 30 or 80) to the relatively stiff secondary coating 50 or 100 that has an in situ elastic modulus $E_S$ greater than 1200 MPa, or greater than 1400 MPa, or greater than 1500 MPa, or even greater than 1800 MPa. The spring constant $\chi_P$ of the primary coating 40, 90 is defined as $\chi_P = E_P \cdot d_4/t_P$, where $d_4$ is the diameter of the glass section of the fiber (i.e., it is the outer diameter of the glass cladding 20 or 80, wherein $d_4=2r_4$), and $t_P$ and $E_P$ are the thickness and elastic modulus, respectively, of the primary coating 40 or 90. In some embodiments, the spring constant $\chi_P$ of the primary coating 40 or 90 has a value $\chi_P$≤1.6 MPa (preferably $\chi_P$≤1.2 MPa, more preferably $\chi_P$≤1.0 MPa, and even more preferably $\chi_P$≤0.8 MPa), which is desirable for improved microbending resistance (lower microbending losses), since a small spring constant provides lower degree of coupling between the glass section 12 of the fiber and the secondary coating 50 or 100.

Thus, embodiments of the SD fiber 10 can have an outer coating diameter dC≤170 microns, and an outer glass cladding diameter d4≤90 microns, a secondary coating 50 or 100 with in situ elastic modulus $E_S$ greater than 1200 MPa (and preferably >1500 MPa) and a thickness $t_S$ greater or equal to 10 microns, and a primary coating 40 or 90 with an in situ elastic modulus $E_P$≤0.35 MPa, a spring constant $\chi_P$≤1.6 MPa and a thickness of at least 10 microns (e.g., 10 microns $t_P$≤20 microns). It is even more preferable that $\chi_P$<1.5 MPa or $\chi_P$≤1.4 MPa, or $\chi_P$≤1.3 MPa, or $\chi_P$≤1.2 MPa. In at least some embodiments disclosed herein the primary coating 40 or 90 has a spring constant $\chi_P$≤1.1 MPa, $\chi_P$≤1.0 MPa $\chi_P$≤0.9 MPa, $\chi_P$≤0.8 MPa, $\chi_P$≤0.7 MPa, or $\chi_P$≤0.6 MPa. For example, in some embodiments, 0.5 MPa≤$\chi_P$≤1.5 MPa; 0.5 MPa≤$\chi_P$≤1.2 MPa; 0.6 MPa≤$\chi_P$≤1.0 MPa. Alternatively, if the SD fiber 10 has an additional coating (tertiary coating 52 or 102) situated on top of the secondary coating (e.g., an ink or a coating containing ink) of thickness $t_T$, then the sum of the secondary and tertiary coating thicknesses ($t_S+t_T$) is preferably ≥10 microns, and more preferably ≥12 microns, for example 12 microns ($t_S+t_T$) ≤30 microns.

The combined cross-sectional areas of the secondary and optional tertiary coating layers 52 or 102 for the embodiments of SD fibers 10 employed herein is preferably 20,000 sq. microns or greater, more preferably 25,000 sq. microns or greater and even more preferably 30,000 sq. microns or greater, which advantageously ensures that the fiber has sufficient puncture resistance.

In some embodiments, the tertiary thickness $t_T$ of the tertiary coating 52 or 102 is between 0 and 6 microns, for example, $t_T$=3 microns, 4 microns, or 5 microns.

Table 1A below lists example parameters for four example SD fibers 10, where as noted above, d4 is the diameter of the glass section 12 of the SD fiber (i.e., 30 or

80), dC is the diameter of the non-glass coating section 14, $E_P$ is the primary elastic modulus, $t_P$ is the primary thickness of the primary coating 40 or 90, $t_S$ is the secondary thickness of the secondary coating 50 or 100, $T_T$ is the tertiary thickness of the optional tertiary coating 52 or 102 that immediately surrounds the secondary coating 50 or 100, and $\chi_P$ is the spring constant of the primary coating 40 or 90. The ratio dC/d4 is an example value based on the values for d4 and the selected values within the range of values for the thicknesses $t_P$ and $t_S$ and $t_T$ that define the diameter dC.

The optional tertiary coating thickness $t_T$ can be in the range between 0 and 6 microns (i.e., in some embodiments there is no tertiary coating 52 or 102, thus the tertiary coating thickness $t_T$=0). Other embodiments of the SD fiber 10 can contain a tertiary coating 52 or 102 with a thickness $t_T$ between 2 and 6 microns. In these exemplary embodiments, the sum $t_S+t_T$ can be between 10 and 30 microns, i.e., 12 microns$\leq(t_S+t_T)\leq$30 microns.

In some embodiments, the puncture resistance load of the SD fiber 10 can be greater than 20 grams. In some embodi-

TABLE 1A

Parameters for Four Example SD fibers

| | Parameter | | | |
|---|---|---|---|---|
| | Example 1 | Example 2 | Example 3 | Example 4 |
| d4 (μm) | 80-81 | 80-81 | 99-101 | 62-63 |
| $E_P$ (Mpa) | <0.35 | <0.35 | <0.35 | <0.35 |
| $t_P$ (μm) | 15 ≤ tp ≤ 30 | 30 ≤ tp ≤ 65 | 25 ≤ tp ≤ 40 | 10 ≤ tp ≤ 20 |
| $t_S$ (μm) | 150-170 | 240-250 | 190-210 | 120-130 |
| $t_T$ (μm) | 0-5 | 0-5 | 0-5 | 0-5 |
| $t_S + t_T$ (μm) | 12 ≤ $t_S$ + $t_T$ ≤ 30 | 12 ≤ ts + $t_T$ ≤ 55 | 12 ≤ ts + $t_T$ ≤ 40 | 12 ≤ ts + $t_T$ ≤ 20 |
| dC/d4 | 1.85-2.15 | 2.85-3.15 | 1.85-2.15 | 1.85-2.15 |
| $\chi_P$ (MPa) | <1.6 | <1.0 | <1.1 | <1.0 |
| | <1.2 | <0.6 | <1.0 | <0.8 |
| | <0.8 | <0.4 | <0.9 | <0.6 |

An example SD fiber 10 can have a diameter d4=2$r_4$ of the outer cladding 30 (or glass section 12) of about 80.5 microns (i.e., $r_4$=40.25 microns), a diameter dC of the secondary coating 50 or 100 less than 170 microns (e.g., dC=165 microns so that 1.85≤dC/d4≤2.15).

An example SD fiber 10 can also have: a primary coating in situ modulus $E_P$≤0.35 MPa, a primary coating thickness $t_P$ such that 10 microns≤$t_P$≤30 microns; a primary coating spring constant $\chi_P$≤1.6 MPa (e.g., $\chi_P$≤1.2<MPa, 1.0 MPa and even≤0.8 MPa), a secondary coating diameter dS in the range between about 150 and 165 microns, a secondary coating in situ modulus $E_S$≥1200 MPa, and a secondary coating thickness $t_S$ such that 10 microns≤$t_S$≤30 microns.

ments, the puncture resistance load of the SD fiber 10 can be greater than 25 grams. In some embodiments, the puncture resistance load of the SD fiber 10 can be greater than 30 grams. The combined cross-sectional areas of the secondary coating 50 or 100 and optional tertiary coating layers 52 or 102 for the embodiments of SD fibers 10 can also be greater than 20,000 sq. microns, which further improves the puncture resistance.

The refractive index profile parameters and modeled attributes of ten exemplary embodiments of the SD fiber 10 (i.e., Fiber 1 through Fiber 10) corresponding to FIG. 3 are set forth in Tables 1B and 1C, below, where MFD is the mode field diameter as determined by the Petermann II method.

TABLE 1B

| | Fiber 1 | Fiber 2 | Fiber 3 | Fiber 4 | Fiber 5 |
|---|---|---|---|---|---|
| $\Delta_{1MAX}$ (%) | 0.399 | 0.401 | 0.394 | 0.391 | 0.382 |
| $r_1$ | 4.33 | 4.38 | 4.26 | 4.37 | 4.29 |
| $V_1$ (%-microns$^2$) | 6.23 | 6.43 | 6.08 | 6.29 | 5.82 |
| Alpha | 10.07 | 10.28 | 11.32 | 10.85 | 9.81 |
| $\Delta_2$ (%) | 0 | 0 | 0 | 0 | 0 |
| $\Delta_3$ (%) | −0.443 | −0.394 | −0.383 | −0.417 | −0.292 |
| $r_2$ | 9.04 | 9.38 | 10.47 | 10.19 | 10.64 |
| $r_3$ | 14.71 | 14.90 | 15.88 | 16.28 | 17.83 |
| $V_3$ (%-microns$^2$) | −59.7 | −52.8 | −54.6 | −67.1 | −59.8 |
| MFD @ 1310 nm (μm) | 8.45 | 8.50 | 8.52 | 8.59 | 8.61 |
| MFD @ 1550 nm (μm) | 9.43 | 9.49 | 9.61 | 9.65 | 9.76 |
| Dispersion @ 1310 nm (ps/nm/km) | 0.56 | 0.51 | −0.18 | 0.22 | −0.47 |
| Dispersion Slope @ 1310 nm (ps/nm$^2$/km) | 0.090 | 0.090 | 0.088 | 0.089 | 0.088 |
| Zero Dispersion Wavelength (nm) | 1304 | 1304 | 1312 | 1307 | 1315 |
| Theoretical Cutoff Wavelength (nm) | 1245 | 1269 | 1248 | 1264 | 1224 |
| Fiber Cutoff Wavelength (nm) | 1240 | 1260 | 1240 | 1260 | 1220 |

TABLE 1B-continued

|  | Fiber 1 | Fiber 2 | Fiber 3 | Fiber 4 | Fiber 5 |
|---|---|---|---|---|---|
| Bend Loss at 1550 nm for 10 mm diameter mandrel (dB/turn) | 0.049 | 0.072 | 0.082 | 0.03 | 0.078 |

TABLE 1C

|  | Fiber 6 | Fiber 7 | Fiber 8 | Fiber 9 | Fiber 10 |
|---|---|---|---|---|---|
| $\Delta_{1MAX}$ (%) | 0.371 | 0.382 | 0.368 | 0.353 | 0.334 |
| $r_1$ | 4.37 | 4.70 | 4.51 | 4.51 | 4.57 |
| $V_1$ (%-microns$^2$) | 5.94 | 6.71 | 6.23 | 5.98 | 5.89 |
| Alpha | 10.48 | 7.74 | 9.97 | 10.07 | 11.00 |
| $\Delta_2$ (%) | 0 | 0 | 0 | 0 | 0 |
| $\Delta_3$ (%) | −0.375 | −0.385 | −0.333 | −0.360 | −0.365 |
| $r_2$ | 9.61 | 11.02 | 9.98 | 9.93 | 10.19 |
| $r_3$ | 14.28 | 15.13 | 15.27 | 14.59 | 14.62 |
| $V_3$ (%-microns$^2$) | −41.8 | −41.4 | −44.5 | −41.2 | −40.1 |
| MFD at 1310 nm (μm) | 8.71 | 8.83 | 8.84 | 8.96 | 9.17 |
| MFD at 1550 nm (μm) | 9.77 | 9.91 | 9.91 | 10.05 | 10.29 |
| Dispersion @1310 nm (ps/nm/km) | 0.28 | 0.46 | 0.46 | 0.47 | 0.59 |
| Dispersion Slope @ 1310 nm (ps/nm$^2$/km) | 0.090 | 0.089 | 0.089 | 0.090 | 0.090 |
| Zero Dispersion Wavelength (nm) | 1307 | 1305 | 1305 | 1305 | 1303 |
| Theoretical Cutoff Wavelength (nm) | 1224 | 1305 | 1254 | 1228 | 1219 |
| Fiber Cutoff Wavelength (nm) | 1210 | 1280 | 1240 | 1210 | 1200 |
| Bend Loss @ 1550 nm for 10 mm diameter mandrel (dB/turn) | 0.32 | 0.2 | 0.234 | 0.446 | 0.672 |

Some of the optical properties of these exemplary embodiments of the SD fibers 10 are as follows: the mode field diameter MFD at 1310 nm is between 8.2 and 9.4 microns; the mode field diameter MFD at 1550 nm is between 9.2 and 10.4 microns, the zero dispersion wavelength is between 1302 and 1320 nm; the fiber cutoff wavelength is between 1180 and 1280 nm; and the macrobend loss at 1550 nm is less than 0.5 dB/turn when the fiber is wrapped around a mandrel having a diameter of 10 mm. The SD fiber embodiments of Tables 1B and 1C (Fiber 1 through Fiber 10) can be constructed, for example, with an outer cladding diameter $2r_4$ of about 80 to 81 microns. In some exemplary embodiment of the example SD fibers (Fiber 1 through Fiber 10), the relative refractive index $\Delta_4$(%)=0, and the outer cladding 30 or 80 is made of pure silica. In other exemplary embodiments, the diameter $d4=2r_4$ has a value of about 80 to 81 microns and the outer cladding can be updoped or down doped relative to pure silica, but with $\Delta_4 > \Delta_{3MIN}$.

High-Density Optical Fiber Ribbon and Ribbon Cable Interconnect

Figure 5A:
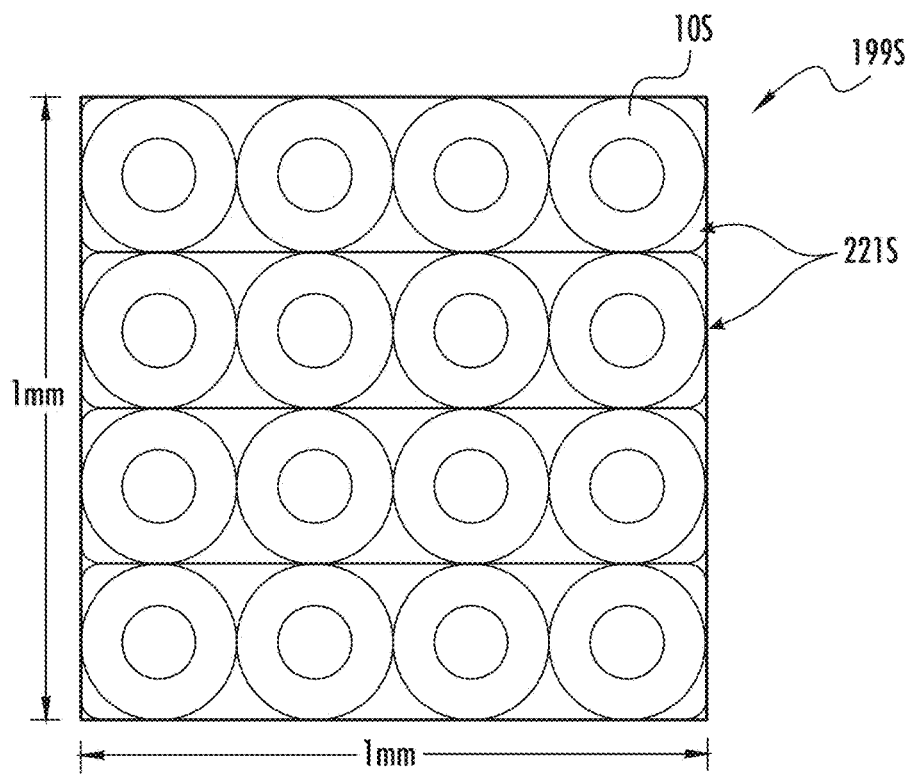
FIG. 5A is an end-on view of a 1 mm$^2$ stack of standard fiber ribbons using standard 125/250 micron optical fibers.
Figure 5B:
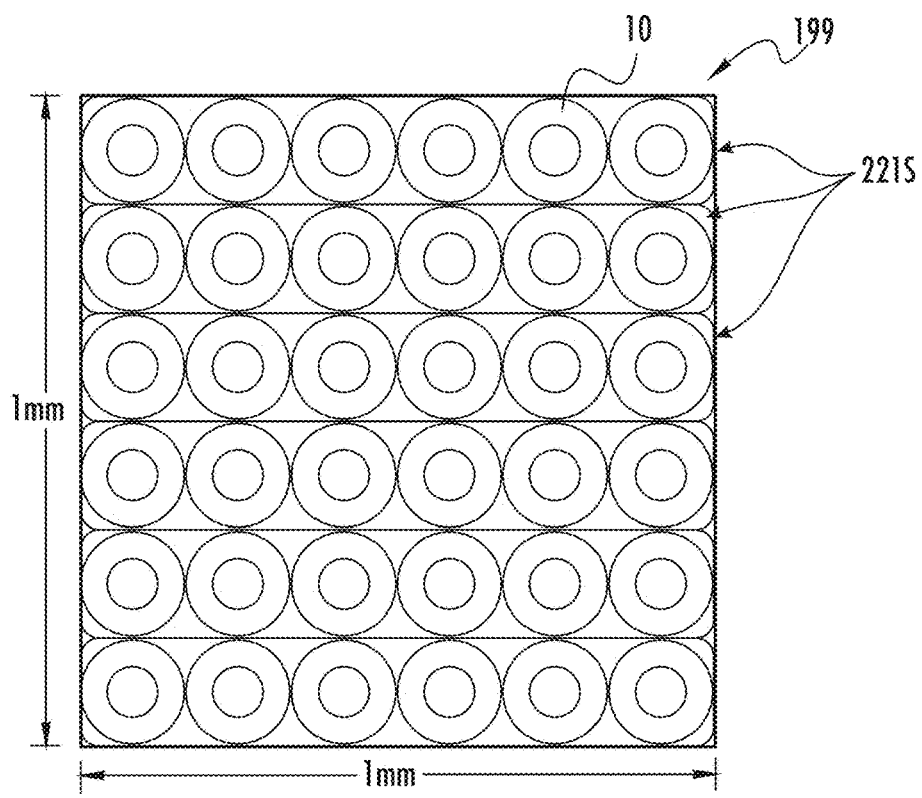
FIG. 5B is an end-on view of a 1 mm$^2$ stack of fiber ribbons using 80/165 micron SD fibers 10.

FIG. 5A is an end-on view of a 1 mm$^2$ stack 199S of standard fiber ribbons 221S made using standard 125/250 micron optical fibers ("standard fibers") 10S. FIG. 5B is an end-on view of a 1 mm$^2$ stack 199 of fiber ribbons 221 using 80/165 micron SD fibers 10. The stack 199S contains a total of 16 standard fibers 10C while the stack 99 contains a total of 36 SD fibers 10. This corresponds to a 125% increase in the fiber density. This increase in fiber density allows for either reducing the size of an optical fiber cable for the same fiber count, or deploying more optical fibers in the same size optical fiber cable.

Figure 6A:
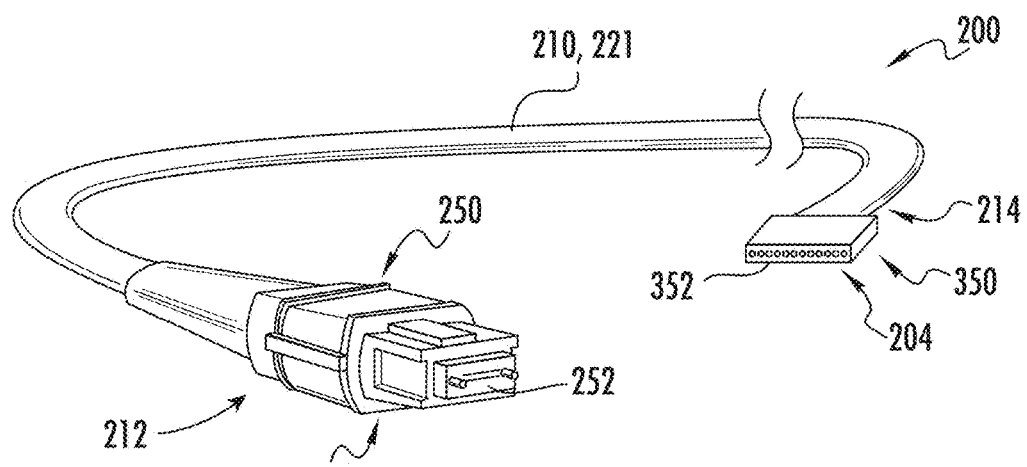
FIG. 6A is an elevated view of an example high-density optical fiber ribbon cable interconnect that includes a ribbon cable terminated at one end by a standard optical fiber connector and at the other end by a high-density optical fiber connector.

FIG. 6A is an elevated view of an example high-density optical fiber ribbon cable interconnect ("ribbon cable interconnect") 200. The ribbon cable interconnect 200 has a first end 202 and a second end 204 and comprises a ribbon cable 210 having a first end 212 adjacent the first end 202 and a second end 214 adjacent the second end 204.

Figure 6B:
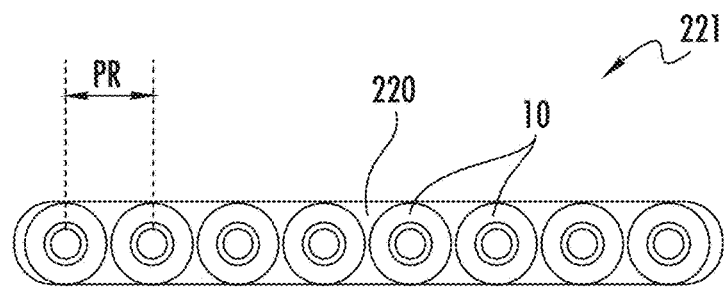
FIG. 6B is a cross-sectional view of an example configuration of the fiber ribbon of the fiber ribbon interconnect.

FIG. 6B is a cross-sectional views of an example configuration of the optical fiber ribbon 221. The fiber ribbon 221 comprises a plurality of SD fibers 10. The example configuration of FIG. 6B comprises the SD fibers 10 shown arranged in a single row and encapsulated by a matrix layer 220 to define the fiber ribbon 221. In an example, the matrix layer 220 comprises a thin layer of clear acrylate (e.g., a few microns thick) that serves to bond together adjacent SD fibers 10. The bond provided by the matrix layer 220 is strong enough to keep the SD fibers together in their ribbon configuration under general use but not so strong that the SD fibers 10 cannot be easily separated when needed. Various other configurations for the ribbon as known in the art can be employed. Note that the encapsulation may be such that portions of the SD fibers 10 are exposed, e.g., the end faces 17 or one or more of the end sections 16, etc.

In one example, the fiber ribbon 221 comprises multiples of 8 SD fibers 10, e.g., 8, 12, 16, 24, etc. In an example, the SD fibers 10 in the fiber ribbon 221 have a pitch PR of about 250 microns, about 165 microns or about 125 microns. It is noted here that in a typical fiber ribbon 221 the end faces 17 of the SD fibers 10 are exposed so that in an example the matrix layer 220 surrounds the outer surfaces of each of the SD fibers 10 but not the end faces 17. Furthermore, portions of the matrix layer 220 can be removed to expose one or more of the SD fibers 10 (e.g., end sections 16), so that in an example, the matrix layer surrounds the SD fibers except for one or more select sections. In such an embodiment, the fiber ribbon 221 can comprise one or more bonded sections that include the matrix layer 220 and one or more unbonded sections that do not include the matrix layer 220 or that do not include the entire matrix layer.

In examples, one or more fiber ribbons 221 are used to form an optical fiber ribbon cable ("ribbon cable"). Example configurations of ribbon cables that can be formed using one or more fiber ribbons 221 are disclosed in U.S. Pat. No. 9,389,382 B2, entitled "fiber optic ribbon cable and ribbon," which is incorporated by reference herein. In some applications, it may be advantageous to use the one or more fiber ribbons to form a ribbon cable, such as when an optical connection needs to be made over a substantial distance that could put the one or more fiber ribbons at risk.

Figure 6C:
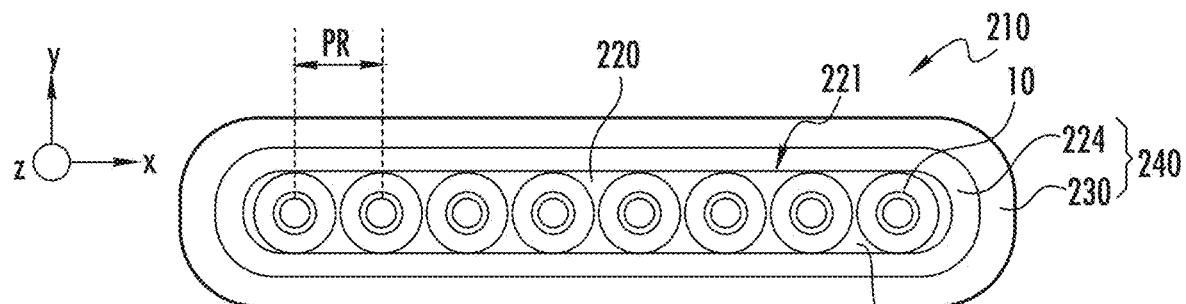
FIGS. 6C through 6E are cross-sectional views of example configurations of the ribbon cable of the ribbon cable interconnect.
Figure 6D:
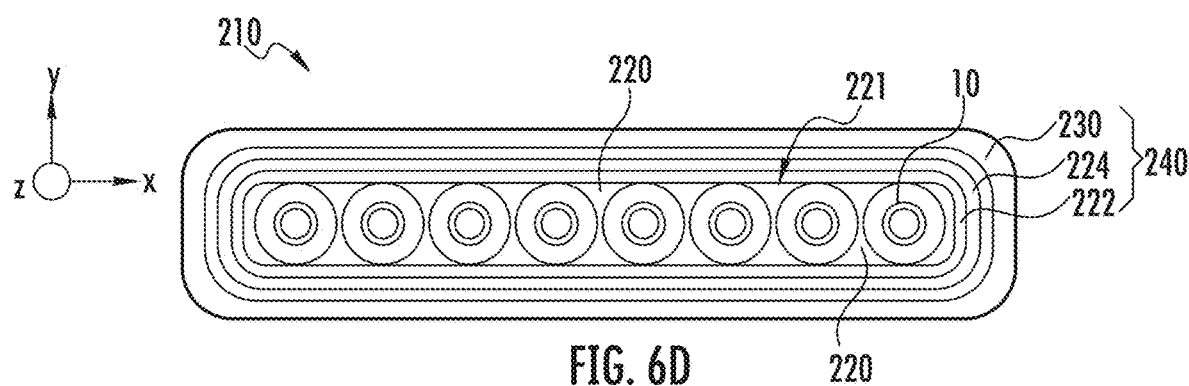

FIGS. 6C and 6D are cross-sectional views of two different example configurations of optical fiber ribbon cables in which the fiber ribbon 221 is surrounded by one or more protective layers 240, which in the example of FIG. 6C comprises a strength layer 224 (e.g., aramid yarn) that surrounds the fiber ribbon 221, and an outer jacket 230 that surrounds the strength layer. The example configuration of FIG. 6D comprises the fiber ribbon and the one or more protective layers 240 comprise a binder layer 222 that surrounds the fiber ribbon, a strength layer 224 that surrounds the binder layer, and the outer jacket 230 that surrounds the strength layer. In an example, one or more fiber ribbons 221 may be loosely arranged within the one or more protective layers 240.

Figure 6E:
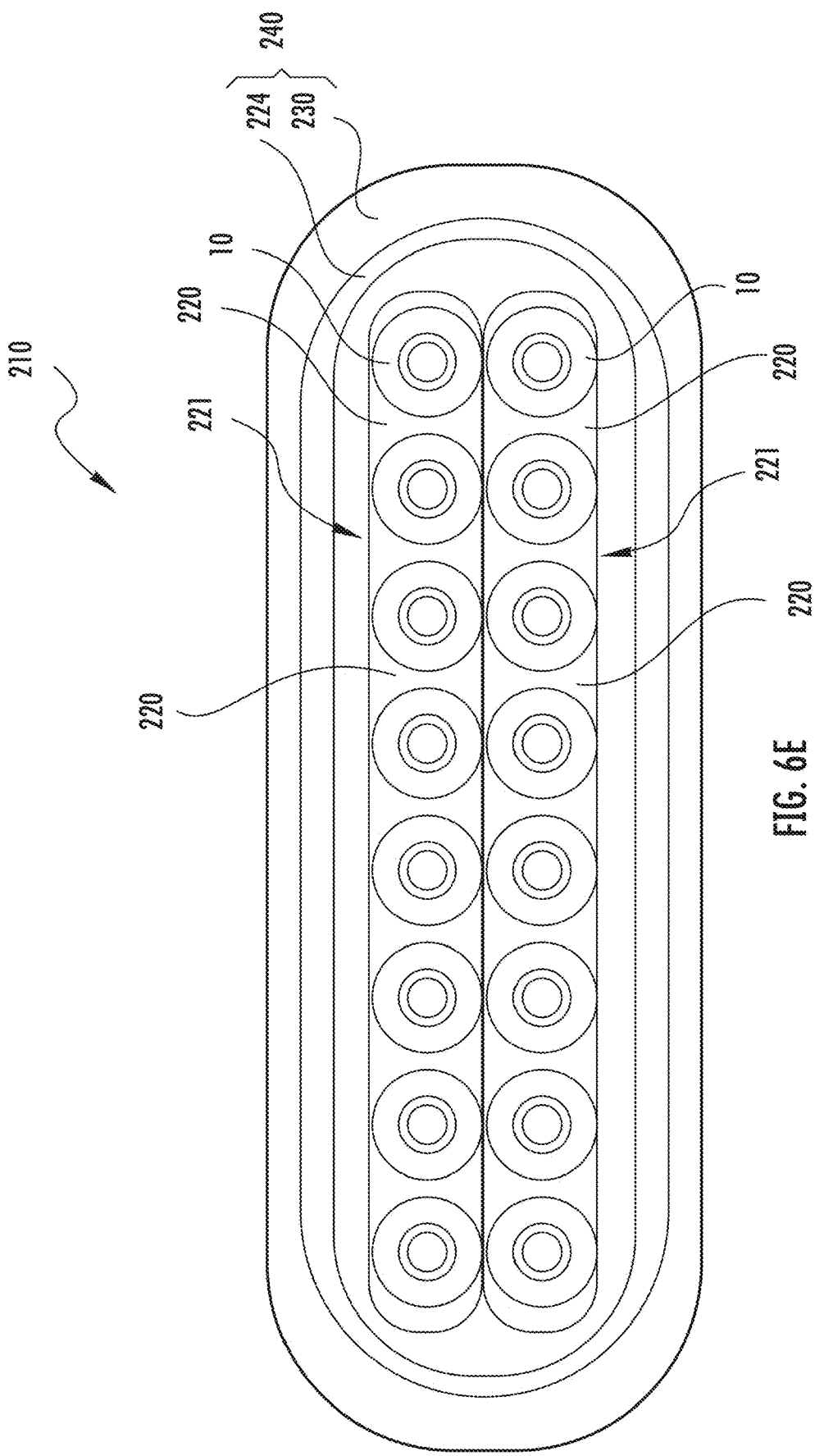

FIG. 6E is similar to FIG. 6C and shows an example of the ribbon cable 210 having multiple (e.g., two) fiber ribbons 221 in a stacked configuration and surrounded by the one or more protective layers 240. In an example, the multiple fiber ribbons 221 are loosely stacked within the one or more protective layers 240. Each fiber ribbon 221 can include two or more SD fibers 10, with four, eight, twelve and sixteen being convenience and useful numbers of SD fibers per fiber ribbon. A variety of other configurations of the ribbon cable 210 can be employed as known in the art using one or more fiber ribbons 221.

With reference again to FIG. 6A, the first end 212 of the ribbon 221 or ribbon cable 210 is terminated by a first optical fiber connector ("first connector") 250, which defines the first end 202 of the ribbon cable interconnect 200. The first connector 250 has an end face ("connector end face") 252. In an example, the first connector 250 comprises a standard optical fiber connector, such an MPO connector, as shown in the elevated views of FIGS. 7A, 7B and 7C. The first connector 250 can include a ferrule 260 with a central axis $A_1$. The ferrule 260 includes a front end 262, a back end 264, and an array 270 of axial holes 272 that run substantially parallel to the central axis $A_1$, with each hole having a hole diameter DH, an edge-to-edge hole spacing SH, and a center-to-center spacing SF, as shown in the close-up inset of FIG. 7A. The holes 272 are sized to support the SD fibers 10, and the center-to-center distance (spacing) SF between adjacent holes 272 defines a fiber pitch P1 at the end face 252 of the first connector.

Figure 7A:
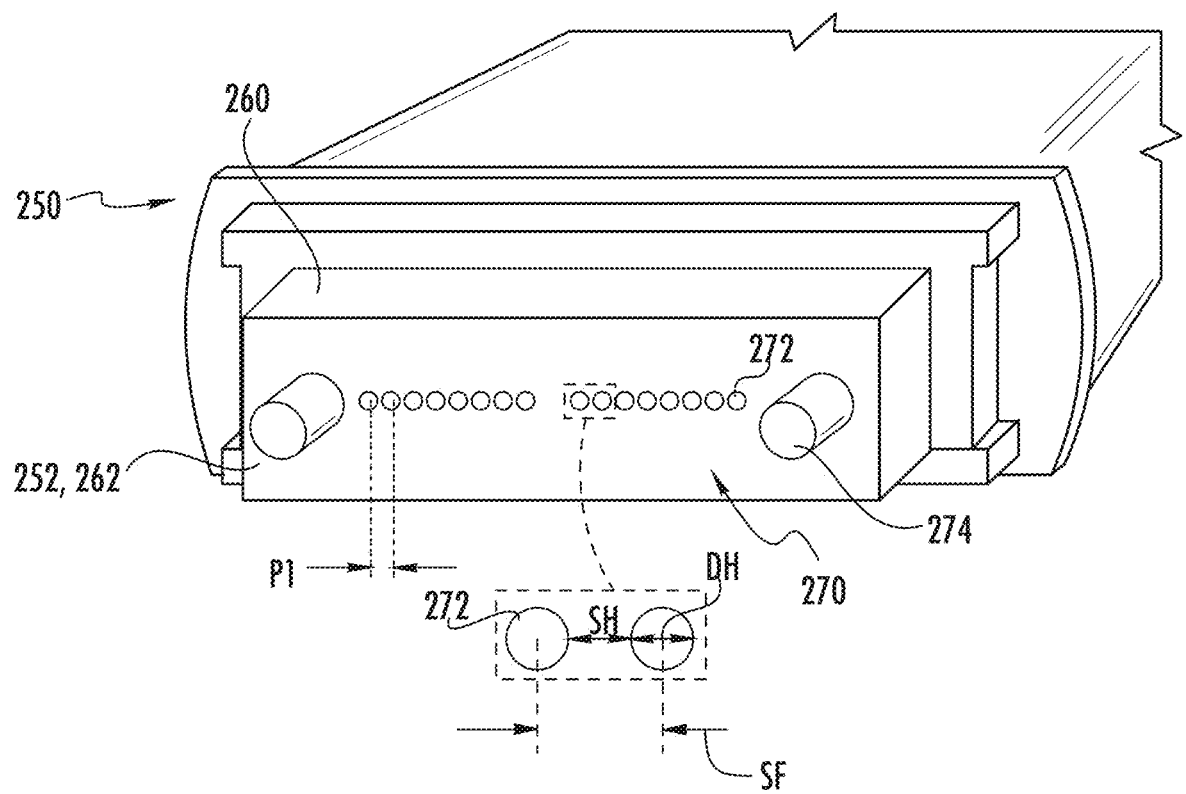
FIGS. 7A, 7B and 7C are front elevated views of an example MPO type of standard optical fiber connectors, with FIGS. 7A and 7B showing the end faces of the SD fibers as supported thereby as arranged in a single row and FIG. 7C showing the end faces of the SD fibers supported thereby as arranged in two rows.
Figure 7B:
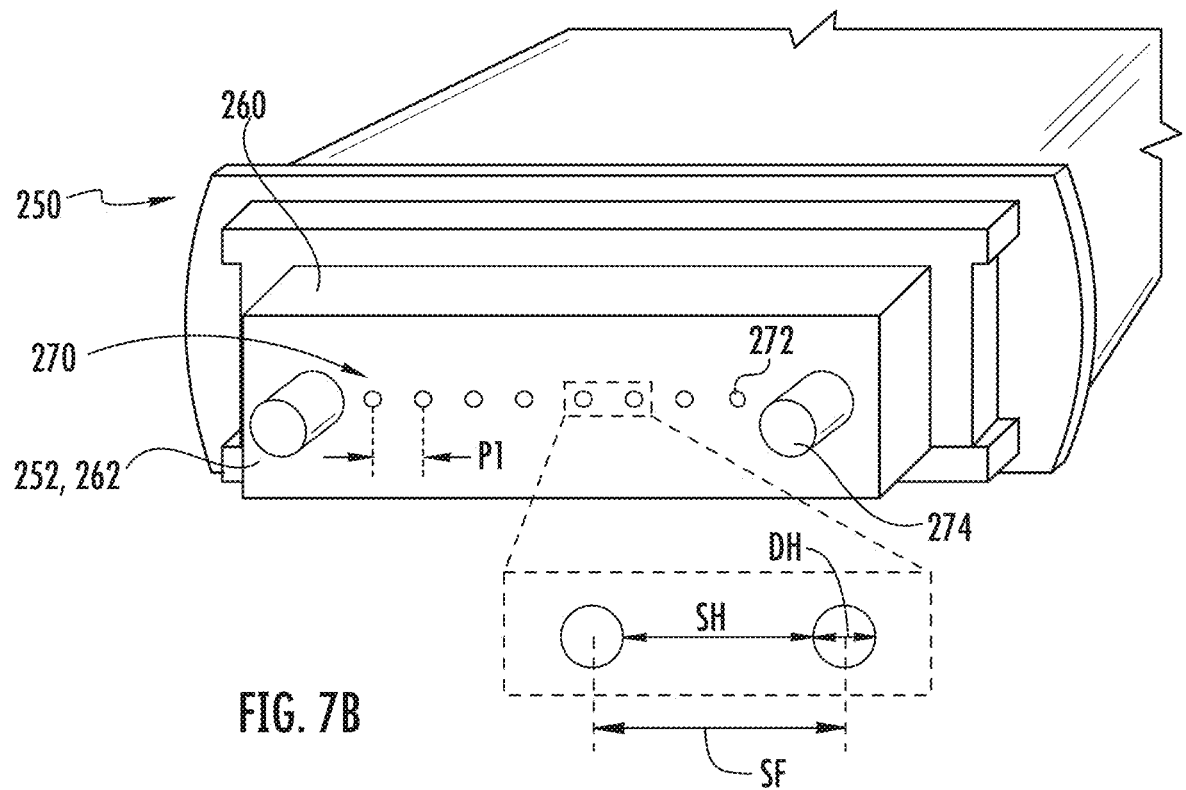

The first connector 250 shown in FIG. 7A supports the SD fibers at a pitch P1, with a double pitch (2P1) between the eighth and ninth SD fibers 10. The example first connector 250 of FIG. 7B supports the SD fibers 10 in an industry standard configuration, e.g., with a pitch P1 of 250 microns, but the diameters DH of the holes 272 at the connector end face 252 have been reduced from the standard value of 125 microns to 80 microns, as shown in the close-up inset (not to scale).

Figure 7C:
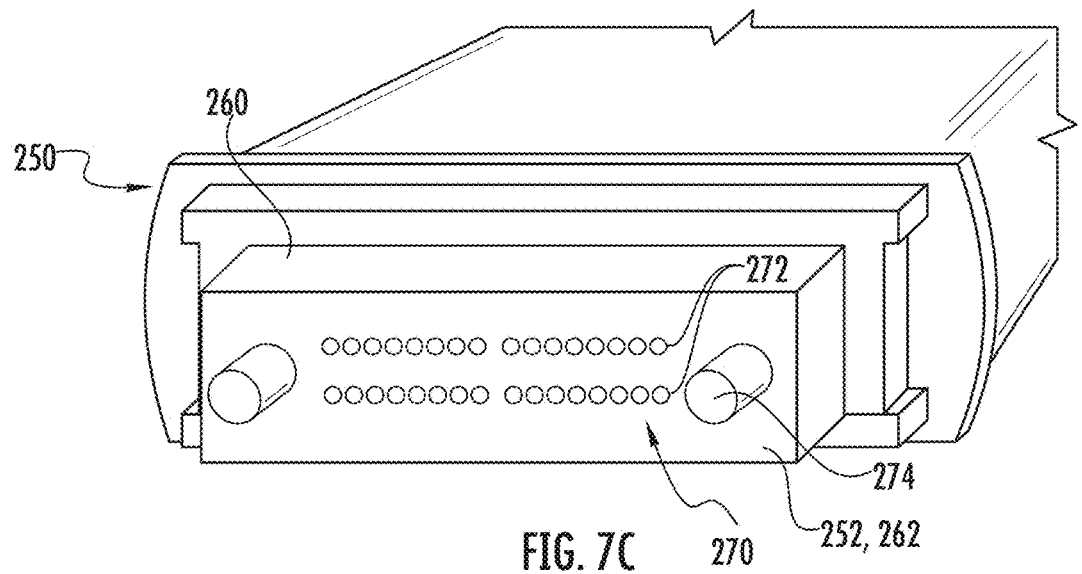

In examples, the hole diameter DH can be 100 microns or 80 microns or 62.5 microns while the edge-to-edge hole spacing SH can be approximately equal to or twice the hole diameter DH (e.g. DH and SH are both about 80 microns, or DH is about 80 microns and SH is about 165 microns). The hole spacing SH and the hole diameter DH defines the pitch P1, which can be defined as the center-to-center spacing SF between adjacent holes 272. The array 170 of holes 172 can be arranged in a single row (FIGS. 7A and 7B) or in multiple rows (FIG. 7C).

The first connector can include one or more alignment features 274, such as alignment pins are alignment holes. The first end 212 of the ribbon cable can also include a flexible boot 280 that flexibly connects the standard connector to the ribbon 221 or ribbon cable 210.

Figure 7D:
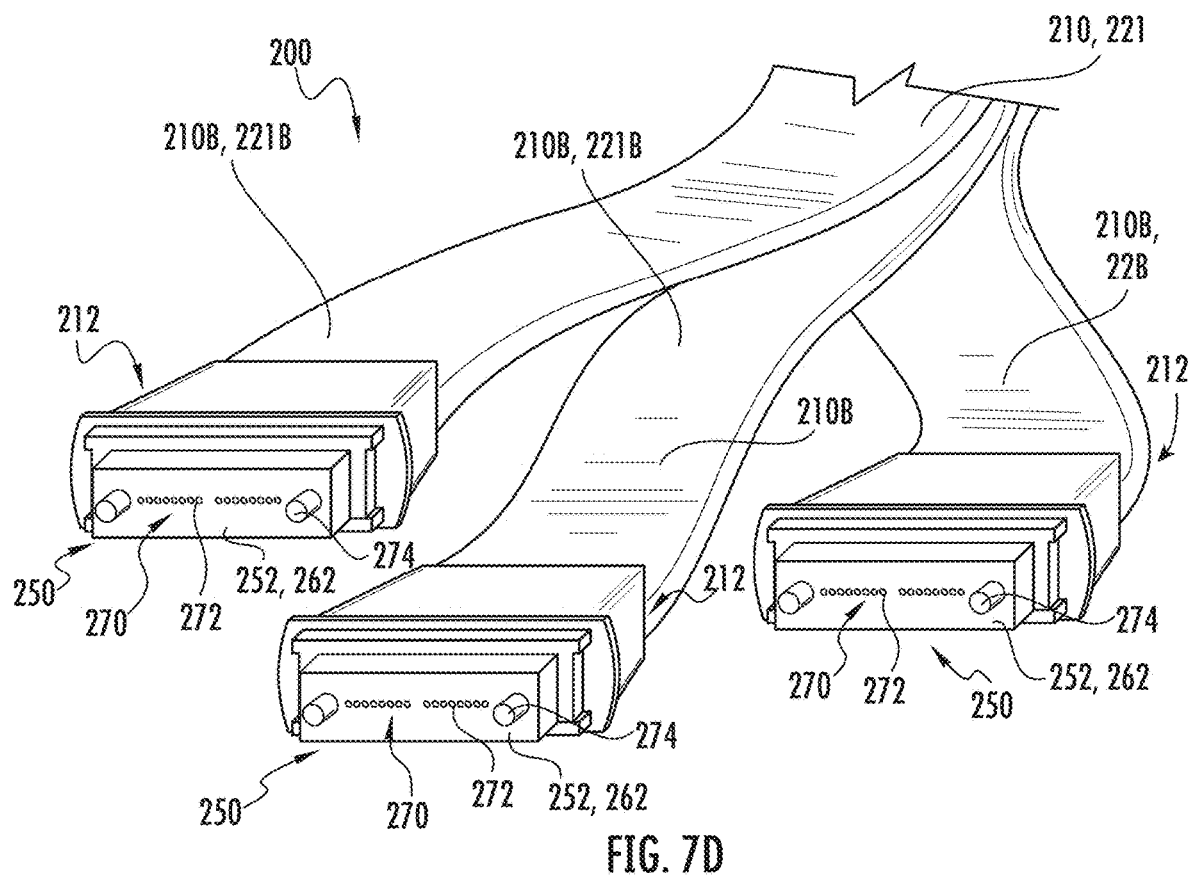
FIG. 7D is a front elevated view of an example configuration of the ribbon cable interconnect wherein the ribbon cable is terminated by multiple (e.g., three) MPO connectors.

FIG. 7D is a front elevated view of an example configuration of the ribbon cable interconnect 200 wherein the ribbon 221 or ribbon cable 210 includes three branches 210B or 221B, each of which terminated by a first connector 250. Or said differently, the first connector 250 can comprise multiple first connectors (which could be called sub-connectors), such as the multiple MPO connectors shown in FIG. 7D. In general, the first end 212 of the ribbon 221 or ribbon cable 210 can include any reasonable number of branches 210B and corresponding first connectors 250.

Figure 8A:
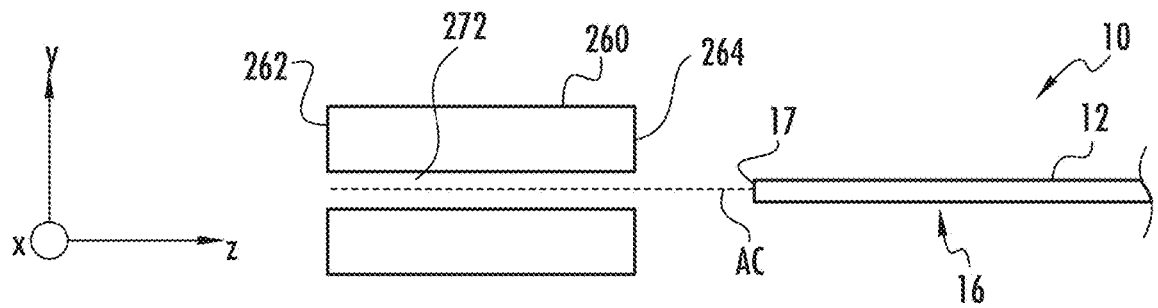
FIG. 8A is a close-up y-z cross-sectional view of a connector ferrule showing one of the ferrule holes and also showing an end section of the SD fiber in position to be inserted into the ferrule hole.

FIG. 8A is a y-z cross-sectional view of an example ferrule 260 of the first connector 250 of FIG. 7A as taken along one of the holes 272. The ferrule 260 has a front end 262 and a back end 264. FIG. 8A also shows a first end section 16 of the SD fiber 10 adjacent the back end 264 of the ferrule and in position to be inserted into the hole 272. The first end section 16 of the SD fiber 10 has an end face 17.

Figure 8B:
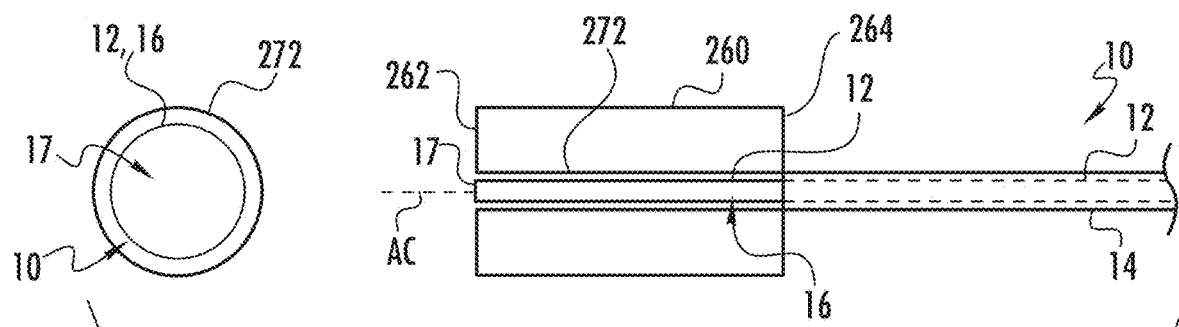
FIG. 8B is similar to FIG. 8A and shows the end section of the SD fiber residing in the ferrule hole, wherein the end section is constituted by the glass section of the SD fiber, which closely fits within the hole as seen in the front-end view on the left.

FIG. 8B is similar to FIG. 8A and shows the SD fiber 10 supported by the ferrule 260 within the hole 272 so that the end face 17 of the SD fiber resides substantially at the front end 262 of the ferrule, which in an example defines the connector end face 252. The example of FIG. 8B shows the hole 272 having a slightly larger hole diameter DH than diameter d4 of the glass section 12 of the SD fiber, which in an example can be nominally 80 or 80.5 microns.

Figure 8C:
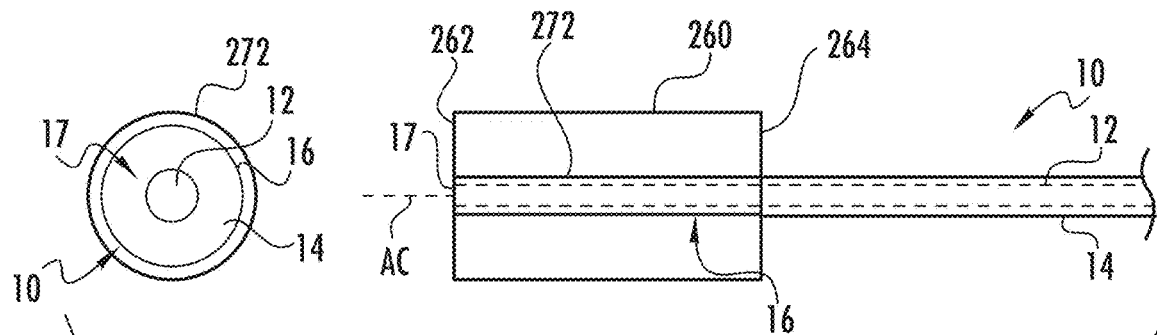
FIG. 8C is similar to FIG. 8B, except that the end section of the SD fiber is constituted by the glass section and the coating section to define a diameter that closely fits within a ferrule hole having a standard diameter, as seen in the front-end view to the left.

The example of FIG. 8C is similar to FIG. 8B but shows an example where the hole 272 has a diameter DH much larger than the glass section 12 of the SD fiber 10 (e.g., 125 microns) so that the end section 16 of the SD fiber includes the coating section 14, i.e., it is not stripped down to the glass section 12 as in FIG. 8A. The diameter dC of the coating section 14 of the example of FIG. 8C is slightly smaller than the hole diameter DH.

With reference again to FIG. 6A, the second end 214 of the ribbon 221 or ribbon cable 210 is terminated by a second optical fiber connector ("second connector") 350 having an end face 352. In an example, the second connector 350 comprises a high-density connector, where the term "high density" means it has a fiber density greater than a conventional or standard connector such as an MPO connector.

Figure 9A:
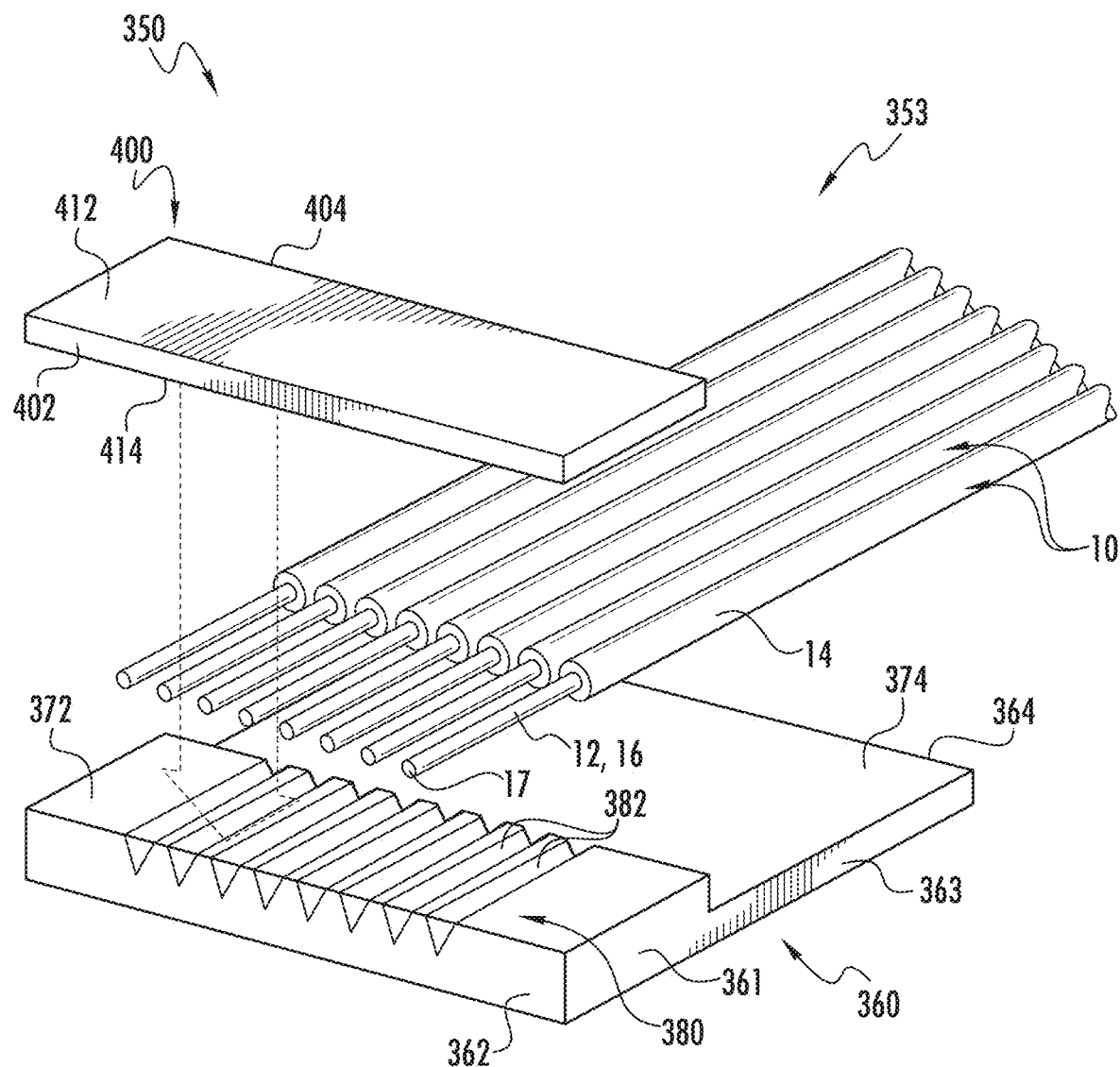
FIG. 9A is an exploded view of an example high-density connector assembly that employs a grooved substrate to support end sections of the SD fibers.

FIG. 9A is an exploded front elevated view of an example method of forming a high-density connector assembly ("connector assembly") 353 that can be used directly as the second connector 350 or can be used to form the second connector (e.g., by adding further connector components). The connector assembly 353 includes a grooved substrate 360 having a front-end section 361 with a front end 362, a back-end section 363 with a back end 364, and a central axis Δ₂ that runs in the z-direction. The front-end section 361 has a planar top surface 372 while the back-end section 363 has a planar top surface 374 that is lower than the top surface 372 of the front section. The front-end section 361 includes an array 380 of grooves 382 formed in the planar top surface 372 and that run parallel to the central axis Δ₂. In an example, the grooves 382 are V-grooves as shown.

FIG. 9A shows the SD fibers 10 extracted from the fiber ribbon 221. Each of the SD fibers 10 has an end section 16 with an end face 17. The end section 16 is shown stripped of the protective coating section 14 to expose the glass section 12. The grooves 380 of the front-end section 361 of the grooved support substrate 360 are sized to accommodate the bare glass end sections 16 of the SD fibers 10 while the back-end section 363 accommodates the coated sections 14 of the SD fibers. Once the end sections 16 of the SD fibers 10 are supported in the grooves 382, then a bonding agent (e.g. epoxy) 390 can be applied to the SD fibers at the back-end section 363. A cover glass 400 having a front end 402, a back end 404, a top surface 412 and a bottom surface 414 is then placed over the top of the array 380 of the grooves 382 to secure the end sections 16 of the SD fibers 10 in the front-end section 361 of the grooved support substrate 360. The cover glass 400 is held in place by the bonding agent 390 contacting the back end 404 of the cover glass. The bonding agent 390 can also be added to the grooves 382.

Figure 9B:
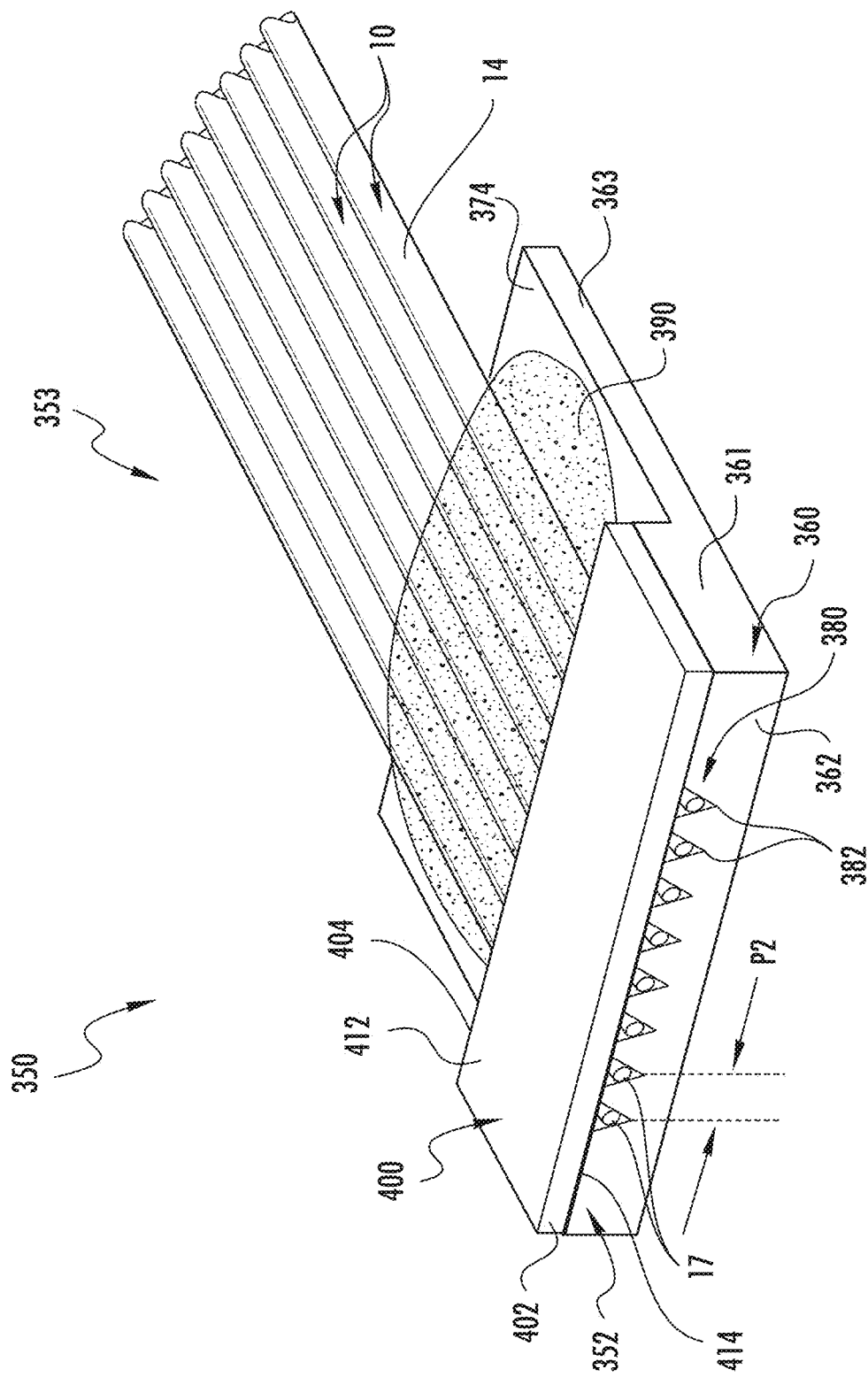
FIG. 9B is an assembled view of the high-density connector assembly of FIG. 9A.

FIG. 9B show the resulting connector assembly 353, with the end faces 17 of the SD fibers residing substantially at the front end 362 of the grooved substrate 260. The connector assembly 353 supports the SD fibers 10 at a pitch P2 at the end face 352.

Figure 9C:
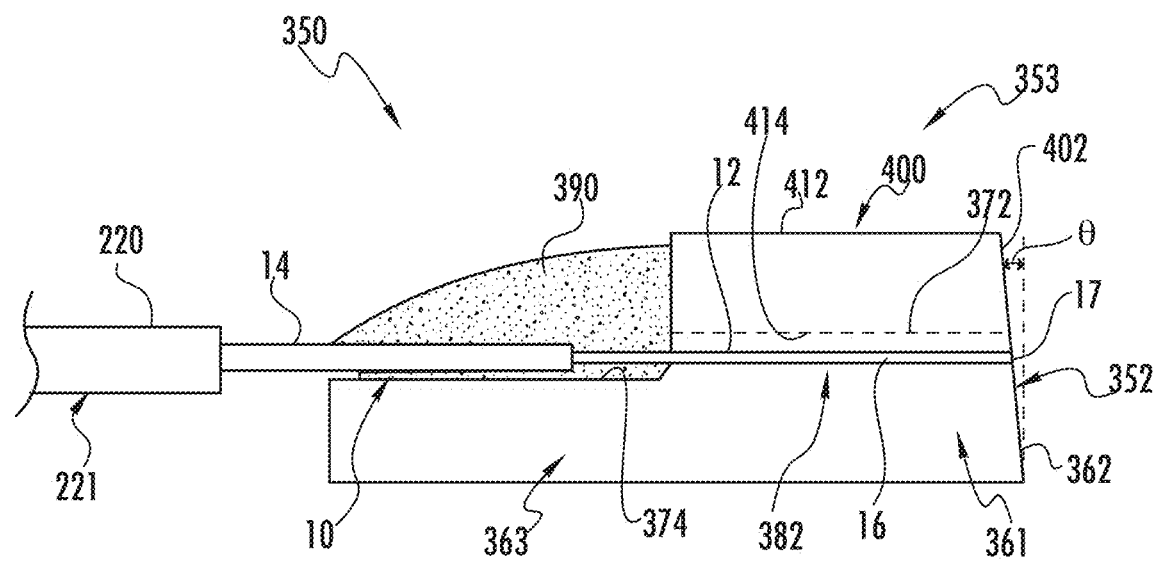
FIG. 9C is a y-z cross-sectional view of the high-density connector assembly of FIG. 9B.

FIG. 9C is y-z cross-sectional view of the second end 214 of the ribbon 221 or ribbon cable 210 showing the connector assembly 353 and one of the SD fibers 10 supported therein. In an example, the front end 362 of the grooved substrate 360, the front end 402 of the cover glass and the end face 17 of the SD fiber are angled by up to about 8 degrees relative to the x-z plane (i.e., the vertical plane VP) to reduce reflection losses.

Figure 9D:
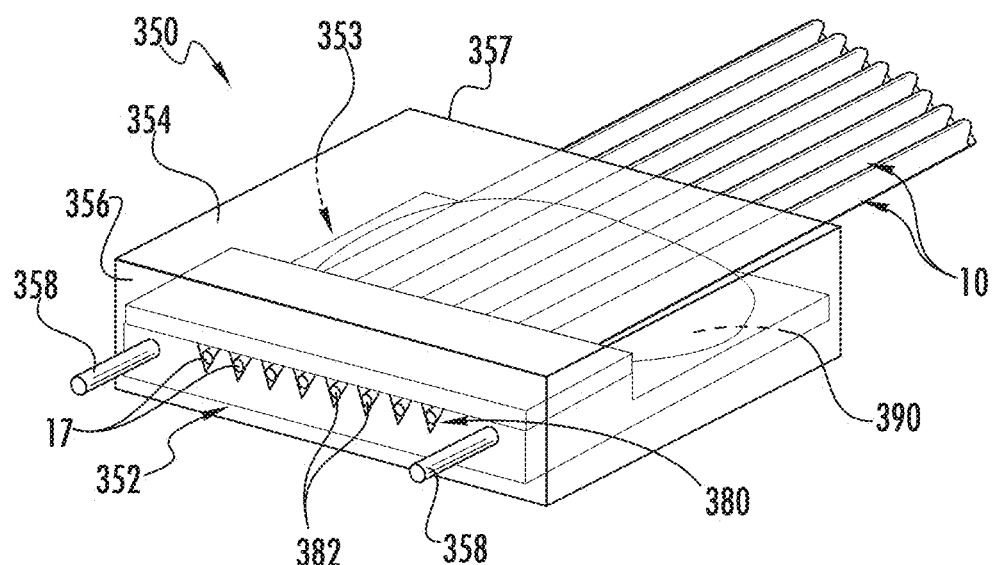
FIG. 9D is similar to FIG. 9B and illustrates an example of a high-density connector formed from the high-density connector assembly and a connector housing.

FIG. 9D is similar to FIG. 9B and illustrates an example high-density second connector 350 formed by at least partially enclosing the high-density connector assembly 353 within a connector housing 354 having a front end 356 and a back end 357. In an example, the high-density second connector includes at least one alignment feature 358, which is shown by way of example as alignment pins that extend from the front end 356 of the connector housing to define a plug connector configuration. The alignment features 358 could also be alignment holes for receiving alignment pins, thereby defining a receptacle connector configuration.

In an example, the front end 362 of the grooved substrate 360 resides at or proximate to the front end 356 of the connector housing 354 while the SD fibers 10 extend from the back end 357 of the connector housing. In another example, the front end 362 of the grooved substrate 360 can extend from the front end 356 of the connector housing 354.

Figure 10A:
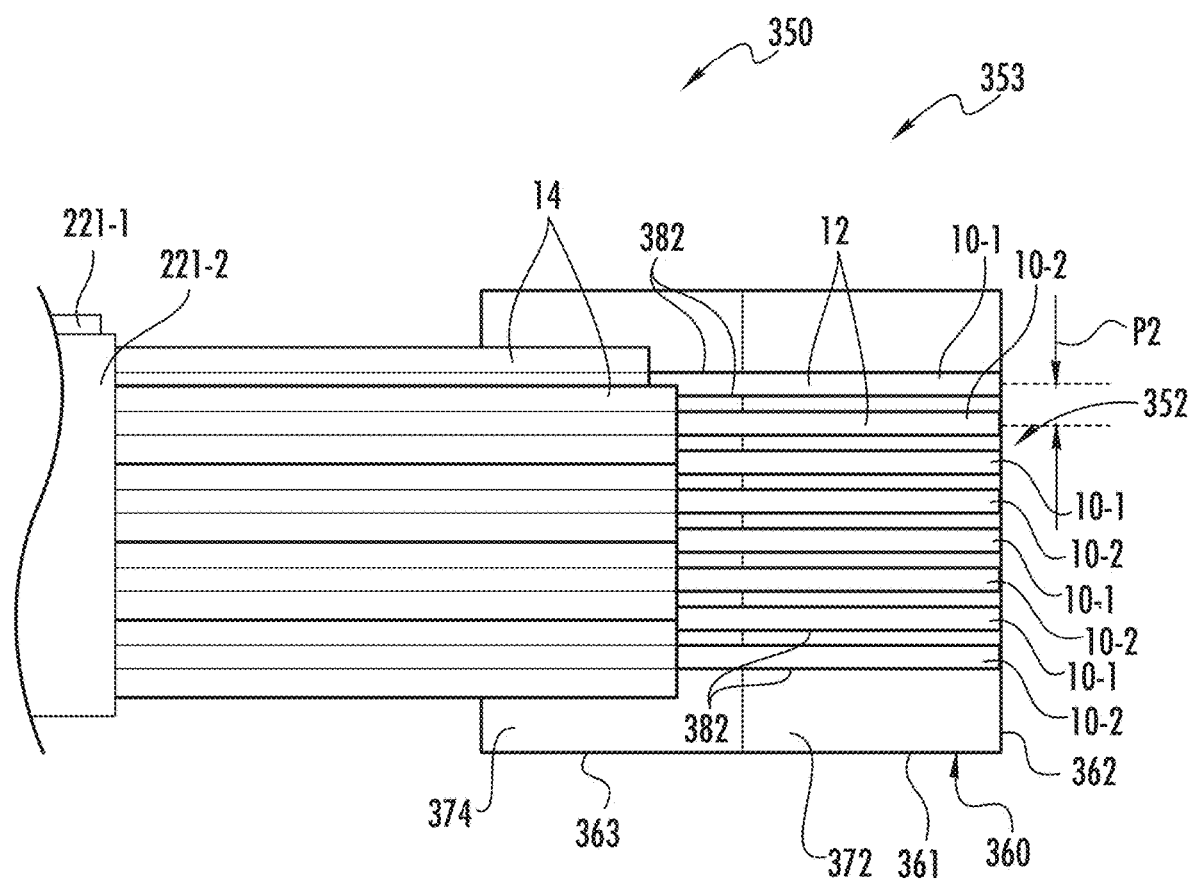
FIG. 10A is a top-down view of an example high-density interconnect that illustrates an example of how the SD fibers from two different ribbons can be interleaved and supported within the high-density connector assembly.

FIG. 10A is a top-down view that illustrates an example embodiment of how the SD fibers 10-1 and 10-2 of respective first and second ribbons 221-1 and 221-2 can be interleaved in the second connector 350. As part of the interleaving process in this example and the examples below, when starting with two fiber ribbons 221-1 and 222-2, the matrix layer 220 and coating sections 14 of the SD fibers 10 are removed from the end section 16 of each of the SD fibers 10-1 and 10-2 to expose the respective glass sections 12. This process can be performed using commercially available mechanical or thermal strippers.

Continuing with the present example, the glass sections 12 of the SD fibers 10-1 and 10-2 are interleaved in the grooves 382 of the grooved support substrate 360 to define the high-density second connector 350. FIG. 10B is a close-up end-on view of the second connector 350. In the example shown, the glass sections 12 of the interleaved SD fibers 10-1 and 10-2 are supported by the grooved substrate 360 at "½ pitch" P2, i.e., wherein the glass sections 12 have a center-to-center spacing SF that is approximately one-half of the pitch PR of ribbons 221-1 and 221-2 or ribbon cables 210-1 and 210-2. The cover glass 400 is shown as having grooves 415 in the bottom surface 414 and sized to engage the end sections 16 of the SD fibers 10. The interleaved (interdigitated) SD fibers 10-1 and 10-2 are denoted as "1" and "2" respectively in the end-on view for ease of illustration.

Figure 11A:
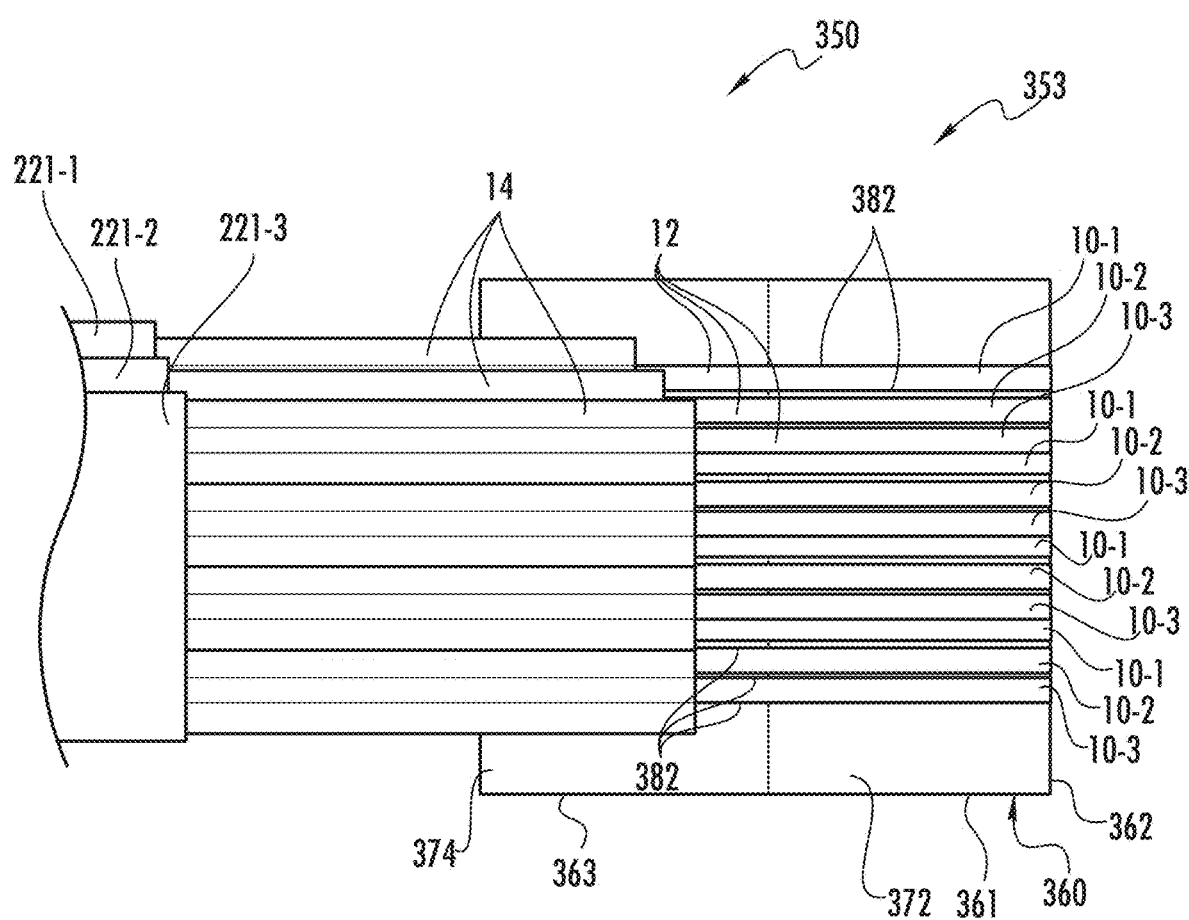
FIG. 11A is similar to FIG. 10A and illustrates a high-density connector assembly formed by interleaving the SD fibers of three ribbons.

FIGS. 11A and 11B are similar to FIGS. 10A and 10B and illustrate the interleaving configuration for first, second and third ribbons 221-1, 221-2 and 221-3 respectively having SD fibers 10-1, 10-2 and 10-3. The resulting SD fibers 10-1, 10-2 and 10-3 can be supported by the grooved substrate 360 at ⅓ pitch P2, i.e., wherein the glass sections 12 have a center-to-center spacing SF that is approximately ⅓ of the pitch PR of the ribbons 221-1, 221-2 and 221-3.

Figure 12A:
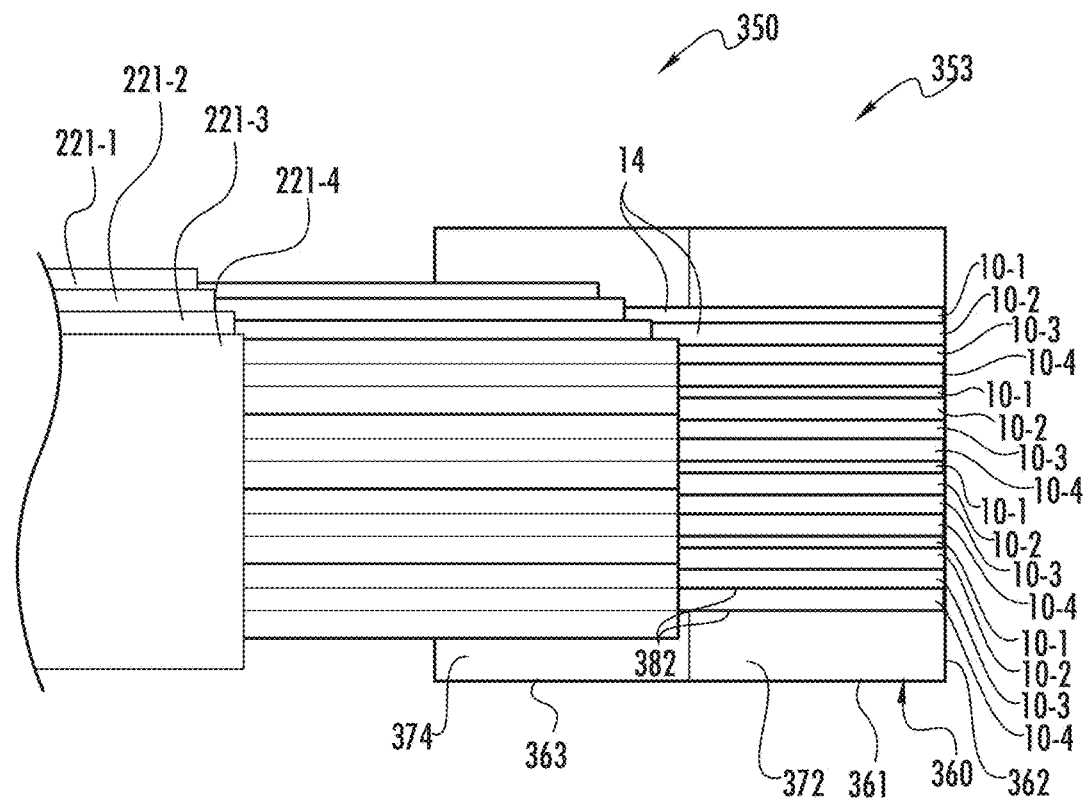
FIG. 12A is similar to FIG. 11A and illustrates a high-density connector assembly formed by interleaving the SD fibers of four ribbons.
Figure 12B:
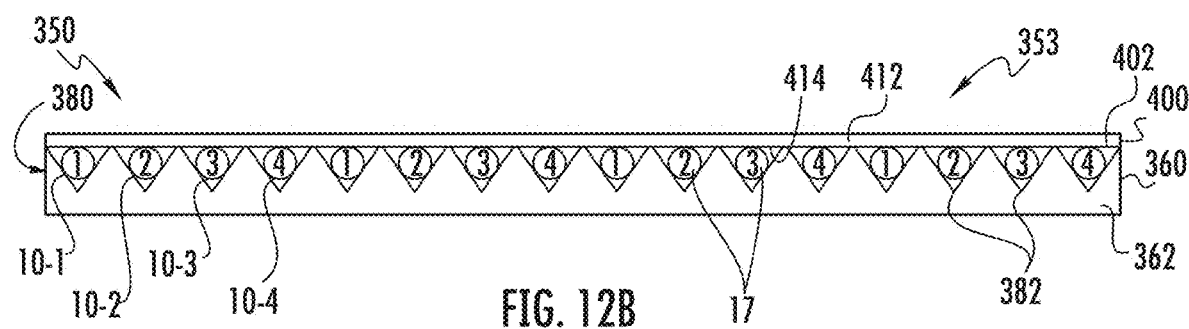
FIG. 12B is similar to FIG. 11B and shows the interleaved SD fibers of the four ribbons.

FIGS. 12A and 12B are similar to FIGS. 11A and 11B and illustrate the interleaving configuration for first, second, third and fourth ribbons 221-1, 221-2, 221-3 and 221-4 respectively having SD fibers 10-1, 10-2, 10-3 and 10-4. The resulting SD fibers 10-1, 10-2, 10-3 and 10-4 can be supported by the grooved substrate 360 at ¼ pitch P2, i.e., wherein the glass sections 12 have a center-to-center spacing SF that is approximately ¼ of the pitch PR of ribbons 221-1, 221-2, 221-3 and 221-4. In the example of FIG. 12B, the cover glass 400 is shown as having a flat bottom surface 414390 and the grooves 382 can be configured to provide a pitch P2=1, i.e., an edge-to-edge spacing SH=d4.

The example ribbon interconnects 200 disclosed herein address the pitch-compatibility problem of connecting high-density fiber ribbons or ribbon cables to legacy (standard density) ribbon cables. In one example, a ribbon interconnect 200 with SD fibers 10 having a glass section with a diameter d4=80 microns can be coated and colored to a total outside diameter dC of a standard fiber, e.g., dC=250 microns (see FIG. 8C). These SD fibers 10 can be incorporated into a fiber ribbon 221 or ribbon cable 210 with a pitch PR of about 250 microns, and the glass sections 12 fitting directly into the holes 272 of a ferrule 260 of a connector 250 with a standard pitch P1 of 250 microns but with hole diameters of 80 microns rather than 125 microns.

At the second end 214, rather than putting only one fiber ribbon 221 into the second connector 350, the glass sections 12 of the SD fibers 10 of two or more fiber ribbons 221 can be interleaved to have a relatively small pitch P2, e.g., on the order of the diameter d4, e.g., P2=250/3=83 microns for interleaving three ribbon 221. The relatively small pitch P2 of the second connector 350 translates into a relatively high fiber density as compared to the fiber density of the first connector 250.

Table 2 below summarizes other examples where the ratio between the outer coating diameter dC and glass diameters d4 (i.e., dC/d4) is substantially integral, i.e., is an integer value to within 10%, and more preferably to within 5%. This enables two or more fiber ribbons 221 (or a ribbon cable 210 with two or more fiber ribbons 221) to be terminated with a standard (e.g., MPO) connector 250 at one (first) end and terminated with a high-density second connector 350 at the other (second) end or interfaced to another ribbon cable terminated with an MPO/MTP connector having the same geometry.

In Table 2 below, "NR" is the number of rows of SD fibers 10 in the first connector 250, P1 is the fiber pitch at the end face 252 of first connector, DH is the hole diameter, IR is the interleave ratio, i.e., the number of ribbons being interleaved, and FP is the "fiber footprint," i.e., the length of the row of SD fibers 10 at the front end of the first connector from one end to the other. The number of SD fibers 10 in each row is sixteen for all of the examples in Table 2, so that the fiber density (fibers/length) is given by 16/FP for the various examples. In other embodiments, the number of SD fibers 10 is twelve, so that the fiber density (fibers/length) is 12/FP. The ratio of the pitch P1 to the hole diameter DH are all approximately integral (e.g., to within 10%), with example values of 2, 3 or 4.

TABLE 2

| NR | P1 (mm) | DH (mm) | IR | FP (mm) | ABR @ 25 Gb/s/fiber | ABR @ 50 Gb/s/fiber | ABR @ 100 Gb/s/fiber |
|---|---|---|---|---|---|---|---|
| 1 | 0.25 | 0.08 | 3 | 4 | 400 | 800 | 1600 |
| 1 | 0.2 | 0.1 | 2 | 3.2 | 400 | 800 | 1600 |
| 2 | 0.2 | 0.1 | 2 | 3.2 | 800 | 1600 | 3200 |
| 1 | 0.165 | 0.08 | 2 | 2.64 | 400 | 800 | 1600 |
| 2 | 0.165 | 0.08 | 2 | 2.64 | 800 | 1600 | 3200 |
| 1 | 0.125 | 0.0625 | 2 | 2 | 400 | 800 | 1600 |
| 1 | 0.125 | 0.0625 | 2 | 4 | 800 | 1600 | 3200 |
| 1 | 0.2 | 0.0625 | 3 | 3.2 | 400 | 800 | 1600 |
| 1 | 0.25 | 0.0625 | 4 | 4 | 400 | 800 | 1600 |

Optical Data Transmission System

Figure 13A:
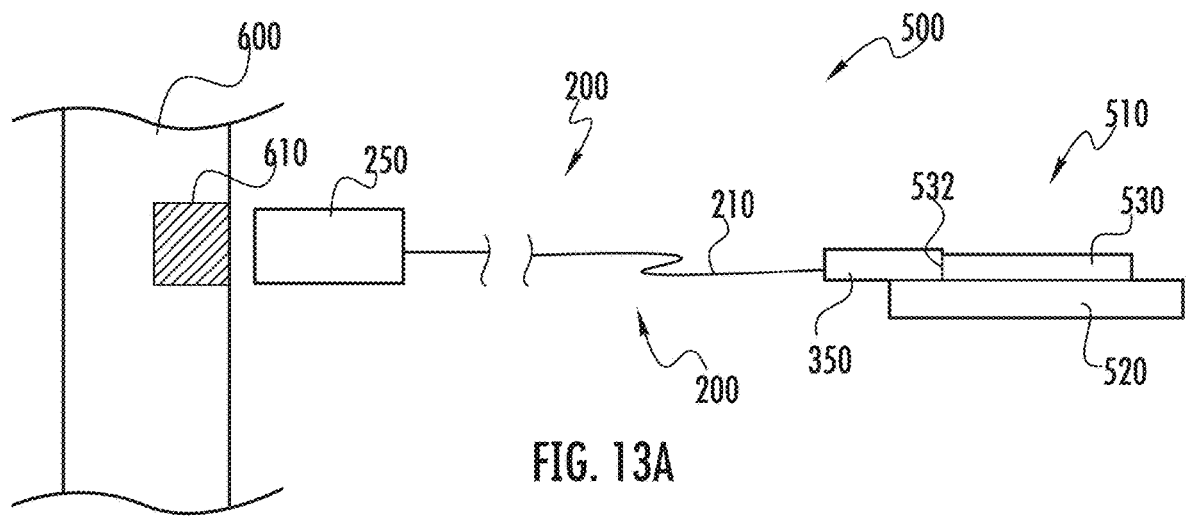
FIG. 13A is a schematic diagram of an example optical data transmission system that employs the ribbon interconnect disclosed herein.

FIG. 13A is a schematic diagram of an optical data transmission system 500. The optical data transmission system 500 comprises a photonic device 510, a telecommunications device 600 having a connector receptacle 610, and the ribbon cable interconnect 200 as disclosed herein.

Figure 13B:
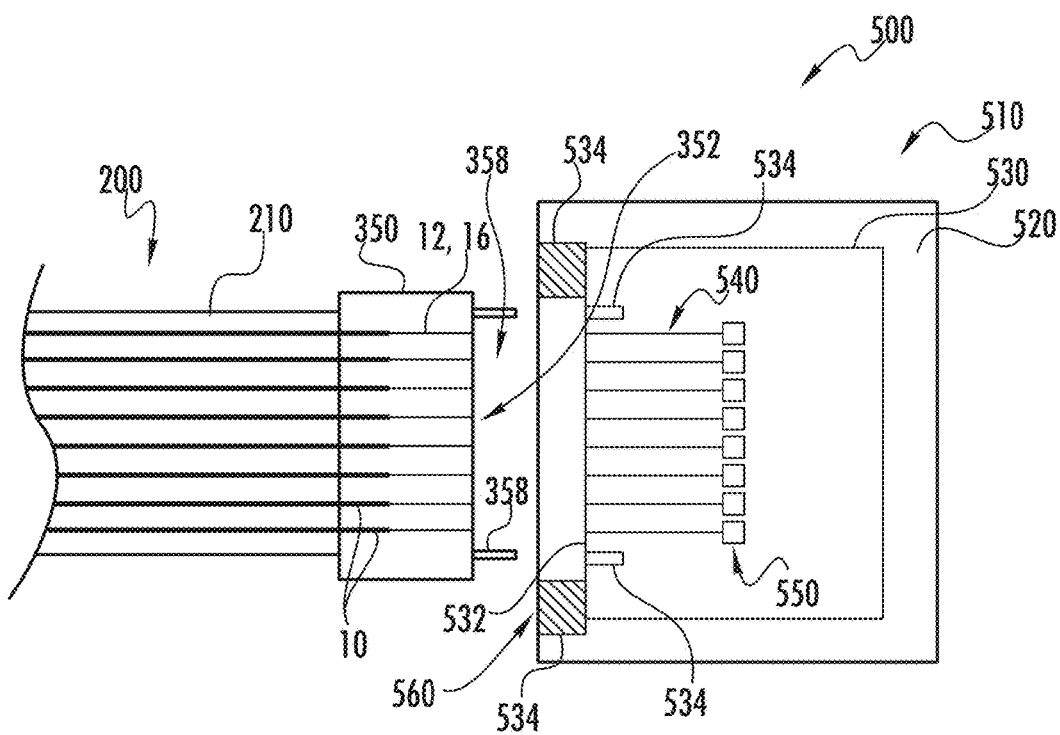
FIG. 13B is a close-up top-down view of an example photonic device and photonic chip having optical waveguides and active photonic elements.

FIG. 13B is a top-down view of an example photonic device 510. The example photonic device 510 includes a circuit board 520 having a top surface 522 and that operably supports a photonic chip 530, e.g., silicon-photonic chip. The photonic chip operably supports an array of optical waveguides 540. As used herein, the term "photonic chip" means any component having optical waveguides 540. The photonic device 510 may further include additional drive circuitry (not shown) to control active optical components to effectuate the conversion of optical signals into electrical signals and vice-versa.

The photonic chip 530 may be fabricated from any material capable of having optical waveguides 540 disposed thereon or therein. As non-limiting examples, the photonic chip 530 may be fabricated from a glass-based material (e.g., glass, glass-ceramic, and fused silica) or a semiconductor material (e.g., silicon). The optical waveguides 540 may be configured as any known or yet-to-be-developed optical waveguides. Non-limiting example optical waveguides 540 include thin-film deposition, photolithographic masking and etching processes, laser written waveguides, ion-exchanged waveguides, channel waveguides, among others. It should be understood that the optical waveguides 540 may be suitably configured for the operations of the photonic chip 530 and are merely schematically depicted in a straight-line configuration.

FIG. 13B also shows the second connector 350 at the second end of the ribbon interconnect 200 in position to operably engage the photonic device 510. The photonic chip 530 has a front end 532 at which the optical waveguides 540 can terminate. Eight optical waveguides 540 are shown by way of example. The optical waveguides 540 are shown by way of example as operably connected to respective active photonic elements 550, which in an example can comprise optical transceivers, optical light sources (e.g., a vertical-cavity surface-emitting lasers or VCSELs) or optical detectors. In an example, the photonic chip 530 is configured to generate and/or receive optical data signals using the active photonic elements 550 and the optical waveguides 540. In an example, the photonic chip 530 can comprise a first sub-chip that includes the optical waveguides 540 and a second sub-chip that includes the active photonic elements 550.

Figure 13C:
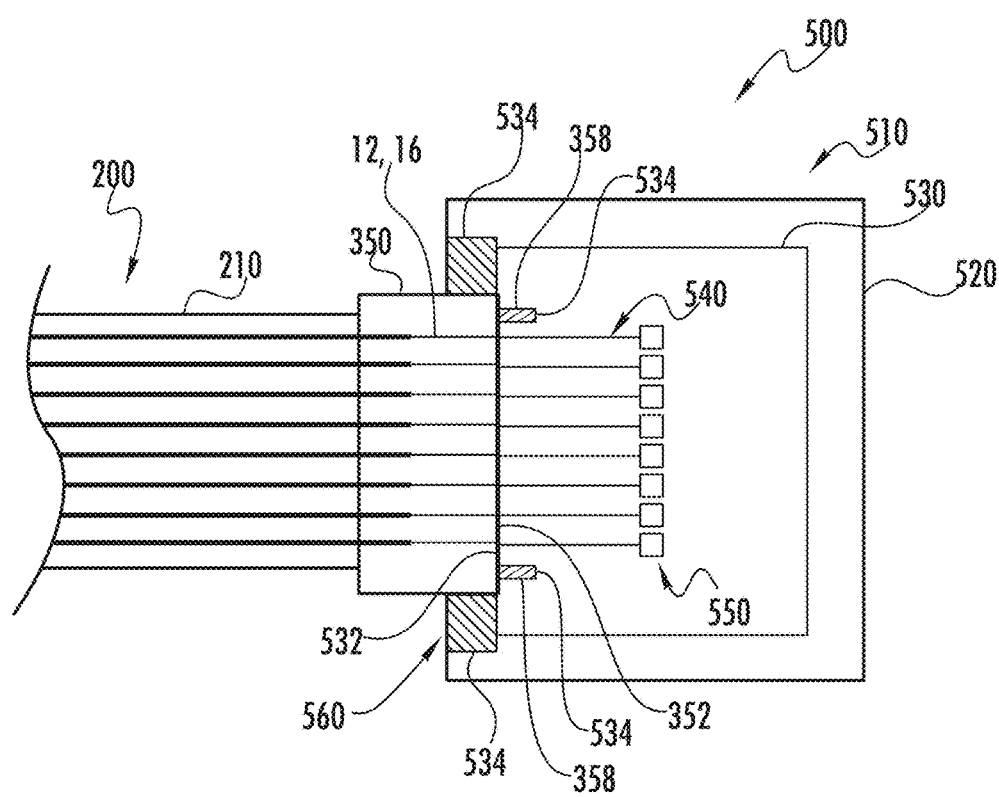
FIG. 13C is similar to FIG. 13B and shows the high-density connector assembly of the ribbon interconnect operably coupled to the photonic device so that the SD fibers are in optical communication with the optical waveguides.

The front-end 532 of the photonic chip 530 can include one or more alignment features 534, which are shown by way of example as alignment holes. Also shown in FIG. 13B is the second connector 350 having one or more alignment features 358 that are complementary to the one or more alignment features 534 of the photonic device 510. The example alignment features 534 are shown in the form of alignment pins sized and configured to closely engage the alignment features 534 when the second connector 350 is operably engaged with the photonic chip 530, as shown in FIG. 13C. The photonic device 510 is shown as having additional alignment features 534 that help guide the second connector into position relative to the photonic chip 530.

The front end 532 of the photonic chip 530 and the alignment features 534 can comprise an optical connector 560 configured to receive the second connector 350 and that allows mating and de-mating of the second connector with the photonic device 510 to establish optical communication between the photonic chip 530 and the ribbon interconnect 200. The optical connector 560 can be configured as receptacle connector (as shown) or as a plug connector.

The optical waveguides 540 have a pitch that matches the pitch P2 of the SD fibers 10 of the second connector 350 so that when the second connector is operably engaged with the photonic device 510 (e.g., via the optical connector 560), the SD fibers are in optical communication with respective optical waveguides 540. The optical waveguides 540 have a high waveguide density, i.e., greater than that associated with standard connectors used in standard optical fiber cables.

With reference again to FIG. 13A, at the other end of the ribbon interconnect 200, the first connector 250 is operably engaged with the connector receptacle 610 of the telecommunications device 600. The telecommunications device 600 can be a wide variety of standard telecommunication devices known in the art, such as a server, a fiber optic cable, an electronics panel in a data center, etc. The first connector has the aforementioned standard fiber density associated with industry standard telecommunication systems.

Figure 13D:
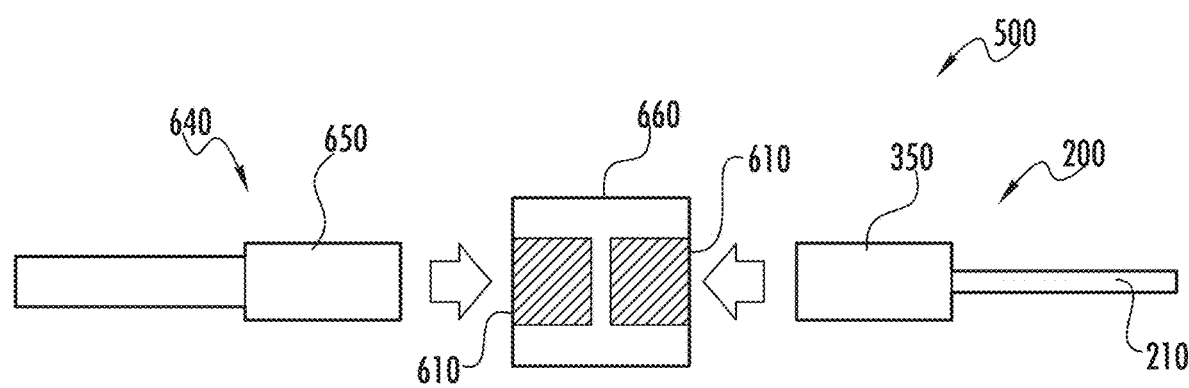
FIG. 13D shows an example of how the standard connector of the ribbon interconnect can be used to optically connect the SD fibers of the ribbon interconnect to optical fibers of a standard optical fiber cable by using an adapter that includes connector receptacles for standard connectors.

With reference now to FIG. 13D, in the example where the telecommunications device 600 is a fiber optic cable 640 terminated by a connector 650, the connector receptacle can be defined by a connector adapter 660 used to operably connect optical fiber cables as is known in the art. Thus, in an example, the ribbon interconnect 200 disclosed herein can be used to optically connect a photonic device having a high waveguide density to a remote telecommunications device having a standard fiber density, such as those associated with conventional MPO connectors.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A high-density fiber ribbon, comprising:
   a) a plurality of small diameter optical fibers arranged in one or more rows, wherein each small diameter optical fiber comprises:
      i) a glass section with a diameter d4;
      ii) a non-glass coating section that surrounds the glass section and having a diameter dC and that defines an outer surface;
      iii) a mode-field diameter at a wavelength of 1310 nm of between 8.6 and 9.5 microns;
      iv) a fiber cutoff wavelength less than 1260 nm;
      v) a bend loss for a single turn of the small diameter fiber around a mandrel with a 15 mm diameter of less than 0.1 dB at a wavelength of 1550 nm;
   b) a matrix layer encapsulating the plurality of small diameter optical fibers; and
   c) an attenuation per each of the small diameter optical fibers as encapsulated in the matrix layer of less than 0.5 dB/km at a wavelength of 1310 nm and less than about 0.4 dB/km at a wavelength of 1550 nm, wherein the ratio dC/d4 is an integer value to within 10 percent.

2. The high-density fiber ribbon according to claim 1, wherein the one or more rows comprises a single row.

3. The high-density ribbon according to claim 1, wherein the integer value of the ratio dC/d4 is either 2, 3 or 4.

4. The high-density fiber ribbon according to claim 1, wherein the diameter d4<105 microns and the diameter dC<205 microns.

5. The high-density fiber ribbon according to claim 4, wherein the diameter d4<85 microns and the diameter dC<170 microns.

6. The high-density fiber ribbon according to claim 5, wherein the diameter d4<65 microns and the diameter dC<130 microns.

7. The high-density fiber ribbon according to claim 1, wherein each of the one or more rows comprises multiples of four of the small diameter optical fibers.

8. The high-density fiber ribbon according to claim 1, wherein the small diameter optical fibers have a pitch PR of either about 250 microns, about 165 microns or about 125 microns.

9. The high-density fiber ribbon according to claim 1, further comprising one or more protective layers surrounding the matrix layer.

10. The high-density fiber ribbon according to claim 9, wherein the high-density fiber ribbon comprises first and second ends, and further comprising first and second connectors that respectively terminate the first and second ends.

11. A high-density ribbon cable, comprising:
    a strength layer;
    an outer jacket surrounding the strength layer; and
    at least one high-density fiber ribbon within the strength layer, wherein each high-density fiber ribbon of the at least one high-density fiber ribbon comprises:
      a) a plurality of small diameter optical fibers arranged in one or more rows, wherein each small diameter optical fiber comprises:
        i. a glass section with a diameter d4;
        ii. a non-glass coating section that surrounds the glass section and having a diameter dC and that defines an outer surface;
        iii. a mode-field diameter at a wavelength of 1310 nm of between 8.6 and 9.5 microns;
        iv. a fiber cutoff wavelength less than 1260 nm;
        v. a bend loss for a single turn of the small diameter fiber around a mandrel with a 15 mm diameter of less than 0.1 dB at a wavelength of 1550 nm;
      b) a matrix layer encapsulating the plurality of small diameter optical fibers; and
      c) an attenuation per each of the small diameter optical fibers as encapsulated in the matrix layer of less than 0.5 dB/km at a wavelength of 1310 nm and less than about 0.4 dB/km at a wavelength of 1550 nm, wherein the ratio dC/d4 is an integer value to within 10 percent.

12. The high-density ribbon cable according to claim 11, wherein the at least one high-density fiber ribbon comprises a plurality of the high-density fiber ribbons arranged in a stacked configuration.

13. The high-density ribbon cable according to claim 11, further comprising:
    a first end terminated by a first optical connector having a fiber pitch P1; and
    a second end terminated by a second optical connector and having a fiber pitch P2 that is less than the fiber pitch P1.

14. The high-density ribbon cable according to claim 13, wherein the fiber pitch P1 is 250 microns or 165 microns, and wherein the fiber pitch P2 is between 80 and 85 microns.

15. The high-density ribbon cable according to claim 13, wherein the first optical connector comprises a multifiber push on (MPO) connector.

16. The high-density ribbon cable according to claim 13, wherein the second optical connector comprises a high-density interconnect comprising a grooved substrate with grooves sized to support respective end sections of the small diameter optical fibers, and wherein the end sections comprise the glass section of the small diameter optical fibers with the non-glass coating section removed therefrom.

17. The high-density ribbon cable according to claim 16, wherein the second optical connector further comprises a connector housing that surrounds at least a portion of the high-density interconnect.

18. The high-density ribbon cable according to claim 13, wherein the at least one high-density fiber ribbon comprises a plurality of the high-density fiber ribbons arranged in a stacked configuration, and wherein the small diameter optical fibers of the plurality of high-density fiber ribbons are interleaved at the second optical connector.

19. The high-density ribbon cable according to claim 18, wherein the second optical connector comprises a grooved substrate having grooves, and wherein the small diameter optical fibers of the multiple fiber ribbons are interleaved in the grooves.

20. The high-density ribbon cable according to claim 13, further comprising:
    a photonic device having a photonic chip that supports a plurality of optical waveguides, and wherein the second optical connector is configured to engage the photonic device so that the small diameter optical fibers are in optical communication with the optical waveguides of the photonic chip.

21. A high-density ribbon cable interconnect, comprising:
    a ribbon cable comprising a first end, a second end, and at least one fiber ribbon comprising plurality of small diameter optical fibers each having a glass section of diameter d4 and a non-glass coating section surrounding the glass section, wherein the non-glass coating section has a diameter dC and defines an outer surface, and wherein the diameter dC<205 microns, the at least one fiber ribbon further comprising a matrix layer encapsulating the plurality of small diameter fibers;

a first optical connector arranged at the first end and having a first fiber pitch P1 that is greater than 125 microns; and a second optical connector arranged at the second end and having a second fiber pitch P2 that is less than 100 microns.

22. The high-density ribbon cable interconnect according to claim 21, wherein each small diameter optical fiber comprises:

a mode-field diameter at a wavelength of 1310 nm of between 8.6 and 9.5 microns;

a fiber cutoff wavelength less than 1260 nm; and a bend loss for a single turn of the small diameter fiber around a mandrel with a 15 mm diameter of less than 0.1 dB at a wavelength of 1550 nm.

23. The high-density ribbon cable interconnect according to claim 22, further comprising:

an attenuation per each of the small diameter optical fibers as incorporated into the matrix layer of less than 0.35 dB/km at a wavelength of 1310 nm and less than about 0.25 dB/km at a wavelength of 1550 nm.

24. The high-density ribbon cable interconnect according to claim 21, wherein the ratio dC/d4 is equal to either 2, 3 or 4 to within 10%.

25. The high-density ribbon cable interconnect according to claim 21, wherein the at least one fiber ribbon comprises multiple fiber ribbons in a stacked configuration.

26. The high-density ribbon cable interconnect according to claim 21, wherein each of the at least one fiber ribbons comprises multiples of eight of the small diameter fibers.

27. The high-density ribbon cable interconnect according to claim 21, wherein the small diameter fibers of the at least one fiber ribbon have a pitch PR of either 250 microns, 165 microns or 125 microns.

28. The high-density ribbon cable interconnect according to claim 21, wherein the first fiber pitch P1 is 250 microns or 165 microns or 125 microns, and wherein the second fiber pitch P2 is between 80 and 85 microns.

29. The high-density ribbon cable interconnect according to claim 21, wherein the first optical connector comprises at least one multifiber push on (MPO) connector.

30. The high-density ribbon cable interconnect according to claim 21, wherein the second optical connector comprises a grooved substrate with grooves sized to support respective end sections of the small diameter optical fibers, wherein the end sections comprise the glass section of the small diameter optical fibers with the non-glass coating section removed therefrom.

31. The high-density ribbon cable interconnect according to claim 21, wherein the second optical connector comprises a high-density interconnect and a connector housing that surrounds at least a portion of the high-density interconnect.

32. The high-density ribbon cable interconnect according to claim 21, wherein the at least one fiber ribbon comprises a plurality of the fiber ribbons in a stacked configuration, and wherein the small diameter optical fibers of the plurality of fiber ribbons are interleaved at the second optical connector.

33. The high-density ribbon cable interconnect according to claim 21, further comprising:

a photonic device having a photonic chip that supports a plurality of optical waveguides, and wherein the second optical connector is configured to optically connect to the photonic chip.

* * * * *

UNITED STATES PATENT AND TRADEMARK OFFICE
CERTIFICATE OF CORRECTION

PATENT NO. : 10,816,743 B2  
APPLICATION NO. : 16/434231  
DATED : October 27, 2020  
INVENTOR(S) : Scott Robertson Bickham et al.

Page 1 of 1

It is certified that error appears in the above-identified patent and that said Letters Patent is hereby corrected as shown below:

In the Claims

In Column 21, Line 28, Claim 3, after "high-density" insert -- fiber --.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*